(12) United States Patent
Rotello

(10) Patent No.: US 9,119,404 B2
(45) Date of Patent: Sep. 1, 2015

(54) OYSTER LIQUOR-COLLECTING AND OYSTER BEAK-OPENING DEVICE

(71) Applicant: Greg Rotello, Danbury, CT (US)

(72) Inventor: Greg Rotello, Danbury, CT (US)

(*) Notice: Subject to any disclaimer, the term of this patent is extended or adjusted under 35 U.S.C. 154(b) by 0 days.

(21) Appl. No.: 14/536,362

(22) Filed: Nov. 7, 2014

(65) Prior Publication Data
US 2015/0147947 A1    May 28, 2015

Related U.S. Application Data

(60) Provisional application No. 61/963,224, filed on Nov. 27, 2013.

(51) Int. Cl.
*A22C 29/04*    (2006.01)
(52) U.S. Cl.
CPC .................... *A22C 29/046* (2013.01)

(58) Field of Classification Search
USPC .......... 452/1–6, 12, 13, 16, 17, 102–105, 198
See application file for complete search history.

(56) References Cited

U.S. PATENT DOCUMENTS

| | | | | |
|---|---|---|---|---|
| 3,991,466 A * | 11/1976 | Smith | ............................. | 30/149 |
| 4,258,452 A * | 3/1981 | Adcock et al. | ................... | 452/81 |
| 4,785,503 A * | 11/1988 | Gomez | ............................. | 452/3 |
| 5,403,230 A * | 4/1995 | Capriglione, Sr. | ................ | 452/6 |
| 6,010,397 A * | 1/2000 | Adams et al. | ................... | 452/13 |
| 6,390,911 B1 * | 5/2002 | Lombardo | ...................... | 452/12 |

* cited by examiner

*Primary Examiner* — Richard Price, Jr.
(74) *Attorney, Agent, or Firm* — Oakwood Law Group, LLP

(57) ABSTRACT

The new device of the present invention is a unique oyster-beak opening device with elements and mechanical features that allow the user of the device to capture an oyster's consumable liquor while safely opening the oyster's beak section. A user of the device can safely and efficiently open the oyster's beak section without the worry or actual potential of being stabbed or injured by this device while minimizing the unintended loss of the valuable oyster liquor.

14 Claims, 39 Drawing Sheets

OYSTER LIQUOR-COLLECTING AND OYSTER BEAK-OPENING DEVICE

REFERENCE TO RELATED APPLICATIONS

This patent application claims the benefit of U.S. Provisional Application No. 61/963,224 filed on Nov. 27, 2013, the disclosure of which is incorporated herein by reference in its entirety.

BACKGROUND OF THE INVENTION

1. Field of the Invention

The present invention relates to mollusk openers and particularly to an oyster opening device and more particularly to a safe, oyster-beak opening device that also collects the oysters consumable liquor.

2. Description of Related Art

For many people the process of opening an oyster with a traditional oyster knife is a physically taxing, dexterously difficult, potentially dangerous and time consuming task and one often accompanied by the inadvertent loss of consumable oyster's liquor which is considered a delicacy.

There are numerous approaches that various people employ to facilitate the opening of fresh oysters. Most involve the use of an oyster knife of which there are numerous traditional and contemporary variants. In actual use oyster knives are inserted into the cartilage-filled channel opening at the 'beak' of an oyster and then directionally and forcefully manipulated into the cartilage filled gap between the oyster's two opposing half-shells by the user. As the forced tip of the oyster knife gains entrance through the cartilage filled channel that links the oyster's two opposing shell-halves, at some critical point in that process the oyster's two half-shells are forced partially open and then become completely-separated specifically at the oysters beak-point. At that stage of the process the beak of the oyster has been pried open but quite often with the unintended spillage and loss of some or most of the consumable oyster's liquor. To complete the process of totally opening the oyster the remaining task for the user is to cut free the oyster's adductor-muscles which are located within the oyster's bill-section. Cutting those two adductor-muscles frees the oyster from its connection to its shell which then completes the process of fully opening the entire oyster. The process of fully opening the oyster is at that point entirely over and the oyster can then be served for consumption. The complex movements that the user performs with the oyster knife include the use of the user's eyes, wrists, hands, fingers and arms, all of which allow the user of the oyster knife a modicum of directional control, of applied force control and of general and specific motion control.

The opening of an oyster by an experienced oyster shucker who deftly wields an oyster knife may appear to be a simple act, but successfully shucking an oyster is actually a sophisticated, physically demanding and considerably nuanced process requiring skill and experience. Opening an oyster is perceived by many persons as dangerous and opening oysters is, in practice, a potentially dangerous process even for those with much experience. For these and other reasons, inexperienced individuals often find the process of opening an oyster with an oyster knife to be intimidating, difficult, unnerving and sometimes impossible to perform. A result for many people is that the opening of oysters, as a food-preparation-routine, becomes one that they approach with trepidation, or one that they avoid entirely and one that they leave to others with more skill or more nerve to perform for them and frequently at a substantial monetary cost.

Many consumers and lovers of oysters forego their desired 'at-home' oyster consumption experiences because of the various difficulties involved with the opening of oyster and as a consequence fewer oysters are sold by the shell fish growers and by the oyster retailing industries than would otherwise be sold if the negative safety issues and the general physical difficulties commonly associated with the opening of oysters by users employing standard oyster knives were somehow negated and alleviated.

Many oyster knives have been fashioned that will open an oyster but none of them capture the oyster's liquor while fully protecting the shucker or user at the same time.

The well documented and widely acknowledged 'safety problem' and injury-issue that is commonly associated with the opening of oysters with oyster knives is a direct consequence of a synergy between two of its functional elements, which working together, make the standard oyster knife nothing short of dangerous, even for seasoned oyster shuckers. The combination of an oyster knife's pointed tip and then its overall length, when combined with the forwarding-pressure that a user typically applies via the handle-grip to drive the oyster knife's pointed-tip into the oyster's beak-point creates the potential for accidental slips which lead to hand stabbing injuries, particularly for the novice but even for seasoned and experienced oyster shuckers. If an oyster knife's blade were shorter it would be somewhat safer and less inclined to damage the users supporting-hand during an incident of knife slippage, but a shorter blade could still unintentionally slip-sideways under the rapid movements and forceful pressures typically applied by a user and then slash, puncture and otherwise injure the user.

A shorter oyster knife blade would also become problematic for a user because a longish knife blade is required for cutting-free the oyster's adductor-muscles after the beak of the oyster knife blade has been pried open by the tip of the oyster knife blade. Further, a longish-blade is also often used to 'flip' a shucked oyster over to expose the oyster's smother underside in order to create a more visually appealing presentational arrangement which is commonly done in fine dining settings, including many restaurants.

There are several deficiencies of design and safety-issue problems associated with modern and historical oyster opening knives. By its nature an oyster knife is charged with performing at least three unique and separate functions, some of them incompatible and leading to user safety issues and often working at odds with one another as well, while causing the difficult usage and safety problems that are historically associated with typical oyster knives.

Furthermore, typical traditional oyster knives do not provide a means for the collection and storage of consumable oyster's liquor which is frequently spilled and lost during the opening of oysters with standard oyster opening knives.

Therefore it is desirable to have a device that can efficiently pry open the oyster's beak, collect and store the oyster's liquor, and protect a user from being injured while using said device to open an oyster's beak section.

SUMMARY OF THE INVENTION

It is an object of the present invention to provide a device for opening an oyster's beak that overcomes the problems mentioned above.

It is an object of the present invention to provide a device that efficiently gathers and temporarily holds an oyster's consumable liquor while said device is being used to open the beak-section of an oyster's shell.

It is an object of the present invention to provide a device that protects a user from being injured while using said device to open an oyster's beak section.

It is an object of the present invention to provide a device that facilitates a user to more efficiently and easily open an oyster's beak.

It is an object of the present invention to provide a mechanically transformable device that is designed to specifically open an oysters beak section then be functionally transformed to specifically cut that oyster's twin adductor muscles.

It is an object of the present invention to provide a device that allows a user to safely apply more directed oyster-opening pressure and more aggressive manipulations via this device towards the oyster-beak being opened and hence to allow the user to more easily and confidently open an oyster by virtue of allowing the user to entirely focus on forcefully manipulating the beak-opening oyster-blade without having to worry about personal safety and personal injury considerations.

This new device of the present invention is a uniquely safe oyster-beak opening device with elements and mechanical features that allow it to capture oyster's liquor while the device allows its user to safely and efficiently open an oyster's beak section without the hesitation and worry normally that's caused by a users knowledge of being potentially injured when using a standard oyster opening knife.

This new device allows oyster's liquor to be captured and retained as the oysters beak section is being opened by the user. This is an important feature because a user employing a traditional oyster knife often inadvertently spills the oyster's liquor during the mechanically intensive process of opening the oyster's shell. This new device helps ensure that the liquor from an oyster is captured and retained within this device, or captured to be then poured into a serving vessel for subsequent use, during the opening of that oyster.

This new device is also designed to resolve the well documented safety issues regarding traditional oyster knives which literally result in thousands of personal injuries per year and the fear of which hinders and prevents many people from both purchasing unopened oysters and opening oysters at home.

The new device achieves these objectives by employing a few distinct and novel features illustrated below.

The first feature is a very short "beak-opening knife blade" or "beak-opening blade" located on the front end of the device's handle that the user employs to push through and pry open the oyster's hinged beak-section. Because this beak-opening blade is much shorter than on a standard oyster knife it substantially lessens the chance that its pointed tip will come into contact with the supporting hand the user employs to hold the oyster in place during the process of prying open the oyster's beak.

The second feature is a rigid "cup", hemisphere, half-globe or similar structure which surrounds the short beak-opening blade. The short beak-opening blade sits within the bowl-structure of this cup and the beak-opening blade's pointed tip is situated slightly below the plane of the cup's open upper rim. When the user employs the beak-opening blade to pry open an oyster's beak section the rim and open bowl section of this cup surrounds the oyster's beak-section and prevents the short beak-opening blade from slipping free of the cup then coming into contact with the users supporting hand. This bowl or cup, in effect, acts as a surrounding retention-guard thereby preventing the short, beak-opening blade from sliding free of and beyond the interior sides of the cup, then coming into dangerous contact with the user's supporting hand. In addition, this cup also acts as an oyster-liquor gathering cup thereby preventing the spillage and loss of commercially and nutritionally valuable oyster's liquor which is common during the opening of oysters with traditional oyster knives. This device captures the oysters consumable liquor as the oysters beak-section is pried open.

The third feature is a "containment area" within the handle to temporarily store the oyster's liquor that has been collected by the cup for later use.

The fourth feature is an additional longer "adductor-muscle cutting blade" located at the rear end of the device, that a user could employ to cut the oysters adductor-muscles once that user has opened the oyster's beak with the small beak-opening blade located at the front of this device. This longer adductor-muscle cutting blade is somewhat dull at its tip and along its two sides as the process of cutting free an oyster's adductor-muscles does not require a sharpened cutting-blade edge.

In another embodiment, the short beak-opening blade is in fact just the exposed front-end section of a substantially longer knife blade, the main length of which is kept retracted in a channel guide that is located within the handle of this device during the point in the oyster opening process when a short, beak-opening knife-tip is functionally required to safely pry open the beak (i.e. in the devices beak opening mode). After the short beak-opening blade tip has performed its beak-opening task and the oyster's beak has been opened the user then manually extends an additionally required length of the knife blade from the interior of the devices handle, thereby altering the device's functionality by allowing the user to mechanically elongate the short, beak-opening blade converting it into a longish adductor-muscle cutting blade that is specifically and functionally suited to become the optimal length required for employment by the user as an adductor-muscle cutting knife which is then used to cut free the oyster's upper and lower adductor-muscles.

The device of the present invention is also applicable for opening other types of mollusk shells besides an oyster's shell.

The cup-like element (protective retaining cup) may be of different dimensions so it can be used to aid in opening variously sized and differing physical types of oysters or even other types of mollusks. The beak-opening blade may be of differing lengths so it can be used to open variously sized oysters or other types of mollusks as well.

Both the protective, liquor-collecting retaining cup and the beak-opening blade may be statically connected to or removably attached to the devices handle at any point or place along the handle, including handle top and handle sides depending on what someone skilled in the arts determines to be an optimal location in terms of utility, functionality and ergonomically efficient design.

In an exemplary embodiment of the present invention, there is disclosed a device for capturing an oyster's consumable liquor while safely opening an oyster's beak comprising a short beak-opening blade for prying open the oyster's beak section; a protective retaining cup surrounding the oyster's beak-opening blade for protecting users from getting injured by the oyster's beak-opening blade and for collecting the oyster's consumable liquor as the oyster's beak section is being pried open, the protective retaining cup having an upper rim that is above a tip of the short beak-opening blade and a base; an ergonomic handle having a containment area therein for holding the oyster's liquor channeled from the protective retaining cup; wherein the protective retaining cup is attached at its base to the front end or the side of the ergonomic handle.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

DESCRIPTION OF THE PREFERRED EMBODIMENT

Figure 1A:
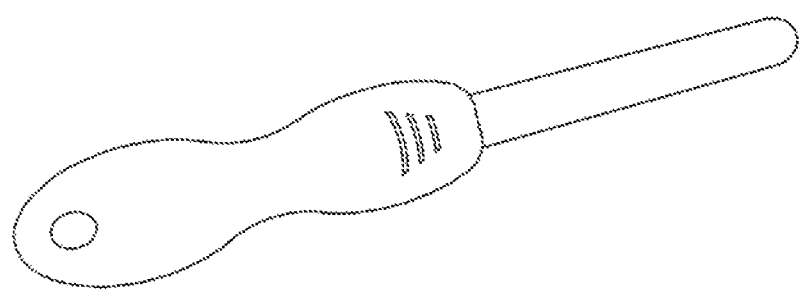
FIG. 1A shows a variation of a typical oyster knife.
Figure 1B:
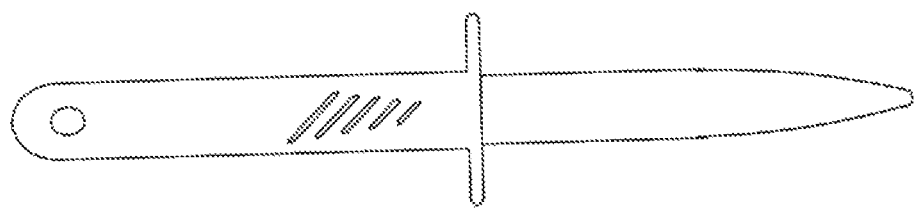
FIG. 1B shows a variation of a typical oyster knife.
Figure 1C:
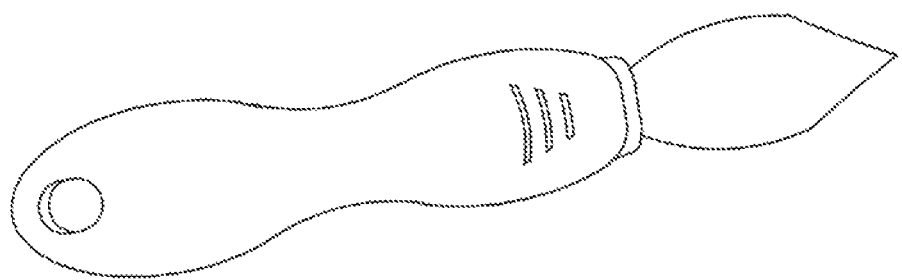
FIG. 1C shows a variation of a typical oyster knife.
Figure 1D:
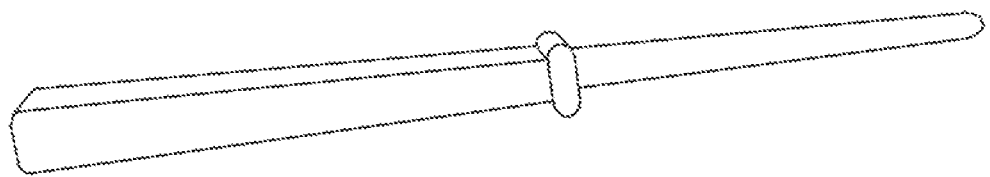
FIG. 1D shows a variation of a typical oyster knife.
Figure 1E:
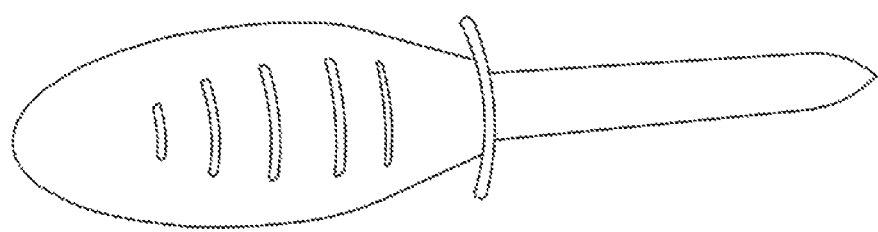
FIG. 1E shows a variation of a typical oyster knife.

Referring to FIG. 1A-FIG. 1E there are disclosed numerous typical oyster knives. The basic elements and functions of a typical oyster knife are listed below.

The first functional element of a traditional oyster knife is its rounded and somewhat slightly-pointed tip. A contoured tip specifically designed and used primarily for facilitating an initial insertion of the oyster knife into the cartilage-filled interstice that binds together the oyster's two opposing half-shells in that area commonly referred to as 'the beak' of the oyster. That knife-blade tip is designed for the purpose of gaining an initial entry into that cartilage-filled interstice with the user manipulating and leveraging that knife-blade tip to mechanically force the two cartilage linked and opposing half shells of the oysters to separate apart. The tip of a traditional oyster knife is also sometimes bent somewhat downwards to a degree in order to facilitate that tip's entry into the oyster's downward-formed beak channel interstice section. FIG. 1 shows a variety of typical traditional oyster knives. The tapered tip point of the oyster knife is designed to allow the user to insert the oyster knife deeply enough into the oyster-beaks interstice, which has a downward slant, in order to gain an easier initial entry and a positioning-hold within that narrow oyster-beak interstice channel in order to allow the user to begin the more forceful manipulations of the tip of the oyster knife, manipulations which eventually facilitate the complete separation of the cartilage-connected link that binds together the oyster's two opposing half-shells that comprise the area referred to as the oysters-beak. This moment of mechanical shell separation, sometimes referred to as "popping the beak" or "popping the oyster" is accomplished by a forceful pushing, twisting, leveraging, turning and angling the tip of the oyster-knifes blade tip in such a manner that the blade tip enters and eventually sunders and separates the connective cartilage that holds together the oysters two opposing half-shells, specifically at the oyster's beak-section.

Said mechanical separation of the oyster's two opposing half shells mentioned above requires a second functional element which is a combination of metallic strength and gauge of the oyster-knife blade. A strong and robust oyster-knife blade-tip allows the user to exert hard force and aggressive manipulative pressures in order to pop the oyster's beak without damaging or permanently bending the knife-blade tip once that tip has been inserted into the beak-section of the oyster while strong manipulative forces are being applied by the user during the beak opening operation.

A third functional element of a traditional oyster knife is its total length. Traditional oyster knives run from about 2 inches in length to well over six inches in length but with an average length of around four and half inches. The reason for their overall length is that the same longish blade, whose short top section of its pointed tip is used to pry open an oysters beak-section during the initial oyster opening operation, is also employed to cut free the oyster's twin adductor-muscles later on during the second half of the oyster-opening operation, an operation which requires an adductor-muscle cutting blade of a sufficiently longish blade length. Alternatively two completely separate and functionally different knives would be safer and easier to use for safely opening an oyster. One knife, a short, strong and semi-pointed blade would be ideally suited for opening and popping an oysters beak, then a second knife, longish, non-sharpened and with a blunt-tipped blade would be ideally suited for the final act of cutting that oysters twin adductor-muscles. Working separately these two separate and functionally differing knife blades would enable a user to open an oyster in a vastly safer mode than would be the case with a single traditional oyster knife, but instead the traditional oyster knife does combine their two physical functions within a single oyster knife blade. As a consequence of the combination of their two dissimilar functions melded within the traditional single oyster-knife blade a mechanical synergism creates a provably dangerous mechanical entity, an oyster knife with a high and proven degree of potential for injuring its user.

As a consequence of one blade being employed to perform two specific oyster opening functions the basic design of a traditional oyster knife is inherently dangerous and always presents an unprotected user with the potential for being harmed. During the oyster shucking process the user of a traditional oyster knife supports the oyster being opened in one hand (i.e. the user's supporting hand) as the users other hand exerts considerable pressure and forceful manipulations on the handle of the oyster knife in order to drive and force the tip of that oyster knife blade into the tough, cartilage connected interstice between the oyster's two opposing half-shells in the effort to forcefully pry-open and to physically separate the two strongly united and cartilage connected opposing half-shells of the oysters beak section.

In doing so there is the constant real potential for that standard oyster knife blade tip to either slip off of or break free from its pressurized contact point at the oyster's beak interstice with that knife's pointed tip, then making a rapid and uncontrolled contact with the user's body resulting in a slashing, cutting or deep-puncture injury to the users supporting hand, wrist or arm. Alternatively the oyster knife being used to pry open the oyster's beak-section can suddenly penetrate and open the oyster's beak-section then rapidly traverse the entire interior of the oysters shell, rapidly exiting between the two forward half-shells at the oyster's frontal bill-section to make a fast and dangerously forceful contact with the user's supporting hand or wrist thereby causing potentially serious injury to the user. Traditional oyster knives have proven themselves dangerous enough that numerous mechanical oyster opening alternatives and devices have been designed which specifically emphasize their safety features, some ideally suited for those not inclined to use the expensive, steel-mesh chain mail glove, which is a recommended safety element for nearly every user of a standard oyster knife. As an oyster's beak begins to open and to separate under the leveraging action of the tip of a typical oyster knife there can also start to occur a substantial loss of the oyster's consumable liquor due to the various angles at which the oyster is being manipulated and held, which commonly leads to uncontrolled and undesired spillage of consumable oyster liquor, a delicacy enjoyed by most oyster consumers. This loss and spillage of an oyster's liquor is very common and an unfortunate side effect that frequently occurs during the angular manipulations that occur during the opening of an oysters beak-section when shuckers and users employ traditional oyster knives.

The new ultra safe, hand-held oyster-beak opening device disclosed herein has distinctive safety qualities and certain new and useful performance characteristics for the benefit of anyone who operates it for the purpose of opening oysters via the oyster's beak while allowing the user to capture and reserve the oyster's consumable liquor, a delicacy and a standard part of the oyster consuming experience for most oyster lovers. This new device is not a replacement for a traditional oyster knife. Although this new device is designed to safely open and pry apart an oyster's beak-section while collecting that oysters liquor it does not "fully open" an oyster in the literal sense of that term, which instead is a process that requires an additional blade or an additional dedicated element that a user employs to also cut free an oyster's two-opposing adductor-muscles after the oyster's beak-section has been pried apart or popped. Only then is the oyster considered to be "fully opened". As a consequence this new device requires an additional blade or element that a user would employ to cut free an oyster's two opposing adductor-muscles after the beak-opening elements of this new device are initially used to pry open the oysters beak-section. As a consequence this device's protective, liquor-gathering cup and the short blade within that cup while working together is technically not an oyster knife, nor are these cited elements an oyster-opener proper, per se. However, the addition of an adductor-muscle cutting blade or an adductor-muscle cutting element could be easily included as a functional part of this new device, but in so far as its relevance to this patent is concerned those additions mentioned above would serve only as design improvisations and not as an integral or utility related aspect of this safe and new oyster-beak opening and oyster liquor collecting device. To reiterate, this new device is specifically designed to safely separate and open an oyster's beak-section and to make that particular task safer, quicker and easier for the user involved then would be possible with a standard oyster opening knife. Equally of importance this new device also allows the user to efficiently capture and collect an oyster's consumable oyster-liquor during the beak opening process. This new device does not perform the function of fully opening an oyster's shell in the proper sense of the term; a function which initially requires the separation of an oyster's beak-section and then the cutting of an oyster's two-opposing adductor-muscles, the act which separates and frees the oyster from its shell. However a novel modification of this device would allow a longish span of edge-beveled material that is fully connected to the handle of this device or is simply a hidden extension of the short, beak-opening blade with that hidden extension being one which could be manually extracted and slid-forward by a user from an internal containment compartment within the handle of the device to then function as and be employed as an adductor-muscle cutting blade, but only after the oyster's beak section was pried open by the short beak-opening portion of said longer blade. As a result of that specific and additional modification this new and novel device could then be technically referred to as an oyster opener, one capable of 'fully-opening' an oyster, by virtue of being capable of opening an oysters beak-section with the short beak-opening section of the retracted longer blade and then, through conversion by blade extension, employ that extended longish blade to cut free that oyster's twin adductor-muscles.

This new type of oyster-beak opener and oyster's liquor collector can be constructed in numerous variant ways, all of which share in common many unique and useful functional elements that make this oyster-beak opener and oyster's liquor collector novel, extremely safe to use, performance-improved, non-obvious and new.

TERMS USED AND DEFINED HEREIN

The terms 'User' and 'Shucker' will be used in this document interchangeably to refer to a person who uses a tool to open an oyster.

The terms 'Beak-Section', 'Oysters-Beak', 'Beak' and 'The Beak' will be used interchangeably to describe that section of an oyster-shell that is the most pointed and narrow and that has traditionally been the area that is opened first by an oyster shucker when using a prying device such as an oyster-knife.

The term 'Oyster-Knife' will be used to describe all elements that are associated with typical, traditional oyster knives. Those elements include the blade itself, the blades pointed or rounded tip, the blade's often angled tip, the blades semi-sharpened edges which are used to cut-free the oyster's twin adductor-muscles and then the actual handle of the oyster-knife and the handles guard if any.

The terms 'Oyster-Liquor Collecting Cup' and 'Liquor Gathering Cup' and 'Cup' and 'Protective Cup' and 'Protective Retaining Cup' will be used to refer to any elements utilized in this beak-opening device that have a 'cup-like topography' (composed of an upper open rim-top, a solid or perforated or skeletal like containing-body and finally a bottom-base), regardless of their other specific physical characteristics such as their lengths, sizes, depths, the materials they're fashioned from and regardless of whether their shapes and cross-sections are oval, circular, rectangular, square, hexagonal or otherwise shaped. Protective cups can also be fashioned from solid metal tubing of a sufficiently strong grade that can be wire-bent to emulate the basic topography of a cup-like element. Being skeletal a wire-frame cup could not hold an oyster's-liquor but a wire-frame cup with a base surrounded by a cup-like retaining-skirt would be sufficient to contain an oyster's beak-section providing the user with protection while also collecting and retaining an oyster's liquor as that oyster's beak-section was being pried open.

The terms 'Beak-Opening Blade' and 'Beak-Opener' and 'Oyster-Beak Opener' will be used in this document interchangeably and to describe and refer to the short, thick, wide, contoured knife-blade included in this new device and the blade that is safely-recessed within the protective, liquor gathering cup structure affixed to this new device. This beak-opening blade is charged with the sole function of safely separating and disconnecting an oyster's two opposing cartilage-connected half-shells which are bound together at the oyster's beak-section by a linkage of tough and fibrous cartilage.

The term 'Handle' refers to any handle like topography regardless of their specific physical characteristics like their lengths, contours and materials regardless of how their general shapes are designed and otherwise fashioned and shaped.

The term 'Supporting Hand' refers to any user's or shucker's hand that cradles, holds or supports an oyster while said user or shucker is wielding an oyster-knife or a beak-opening device in his or her other hand as the user's oyster opening device is being used to force-open an oyster's beak-section.

The terms 'Adductor-Muscle Cutting Knife' and 'Adductor-Muscle Cutting Blade' will be used to describe any dedicated element that is used to cut or release an oyster's two adductor-muscles regardless of the adductor-muscle cutting knives' specific physical-characteristics such as their lengths and gauges and widths and regardless of whether their cross-sections are oval, circular, rectangular, square, hexagonal or otherwise shaped and regardless of whether their tips or edges are dull or sharp.

Figure 2A:
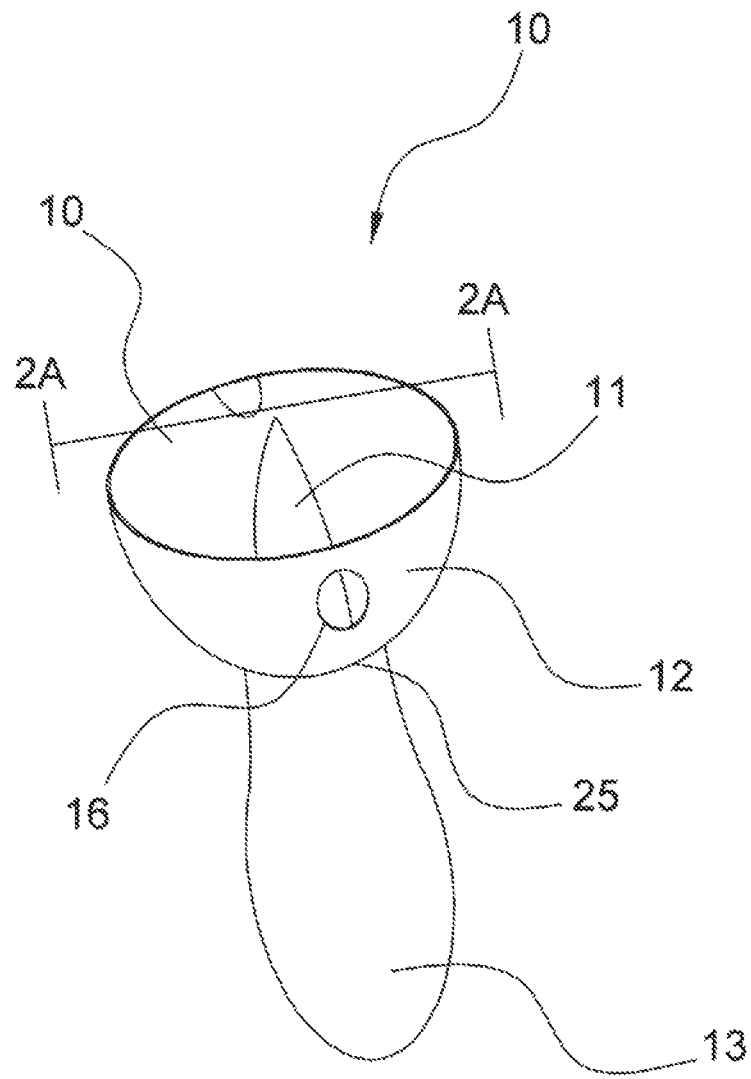
FIG. 2A shows a perspective view of the oyster's beak opening and oyster liquor collecting device according to the principles of the present invention.
Figure 2B:
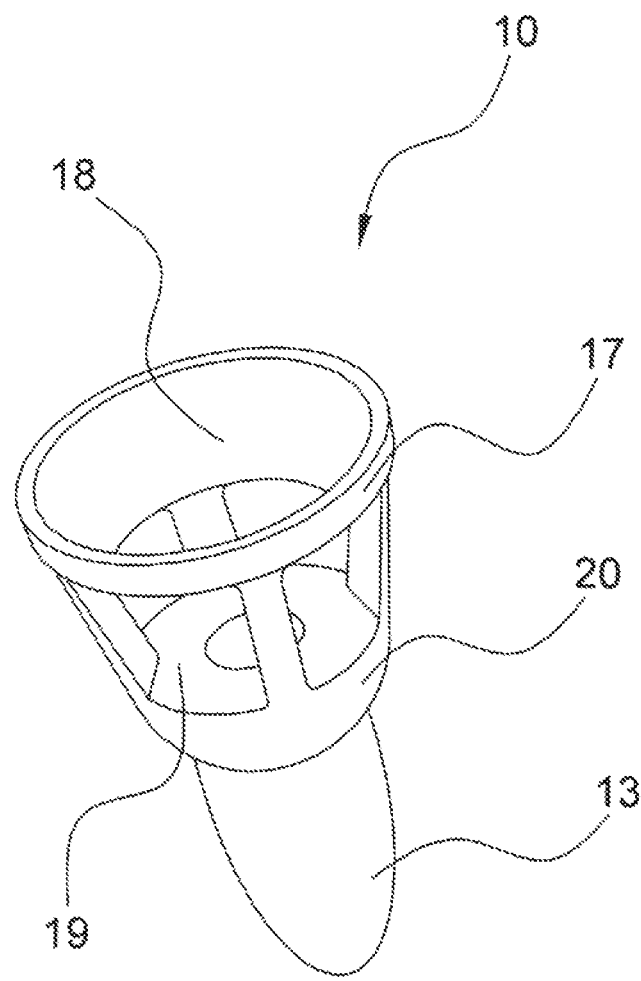
FIG. 2B shows another perspective view of the oyster's beak opening and oyster liquor collecting device according to the principles of the present invention.
Figure 2C:
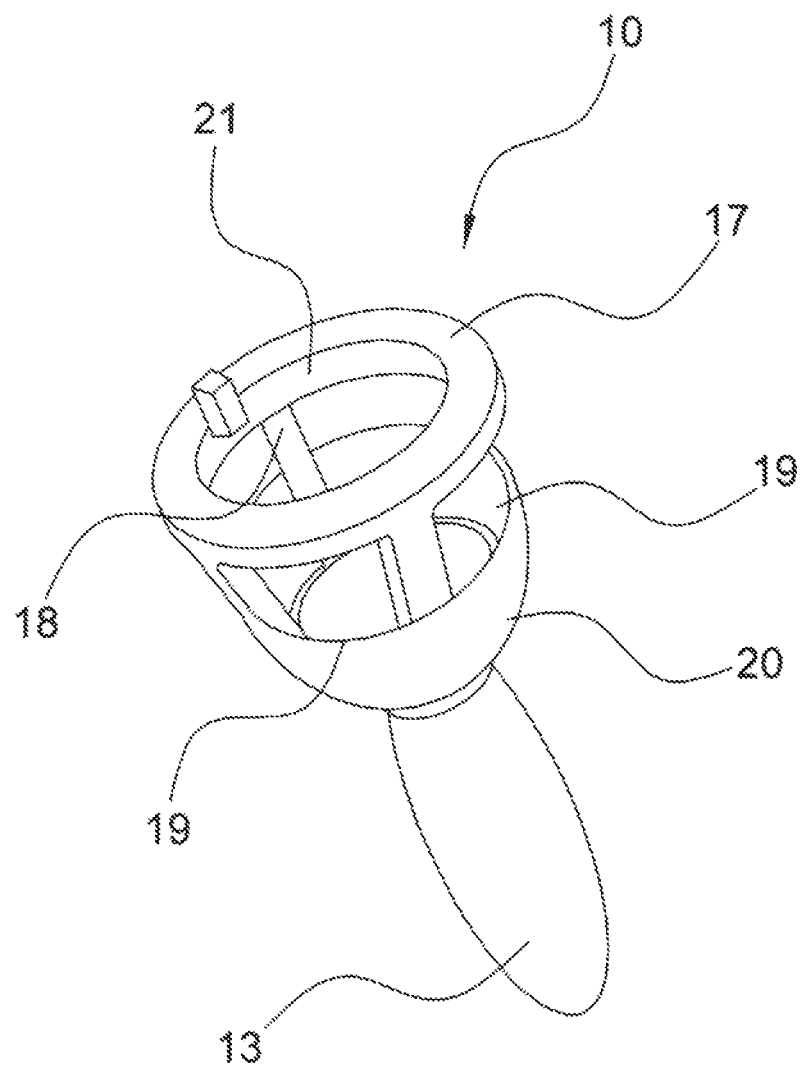
FIG. 2C shows another perspective view of the oyster's beak opening and oyster liquor collecting device according to the principles of the present invention.
Figure 3:
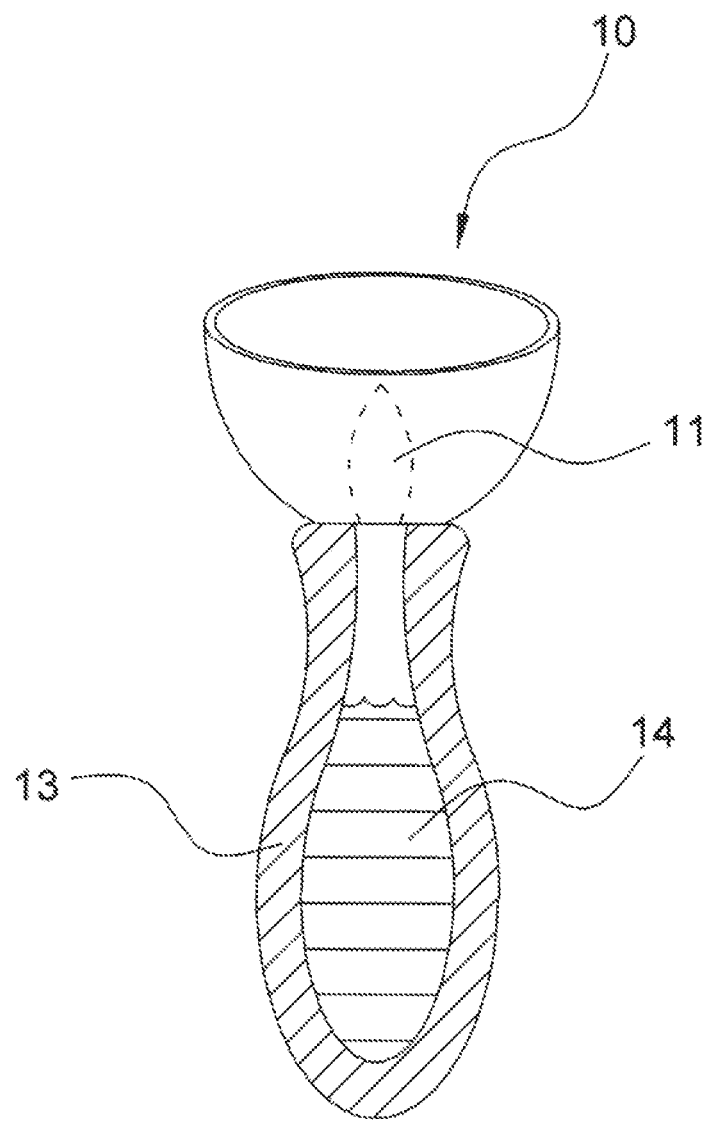
FIG. 3 is a sectional view of the device along the line 2A-2A of FIG. 2.
Figure 4A:
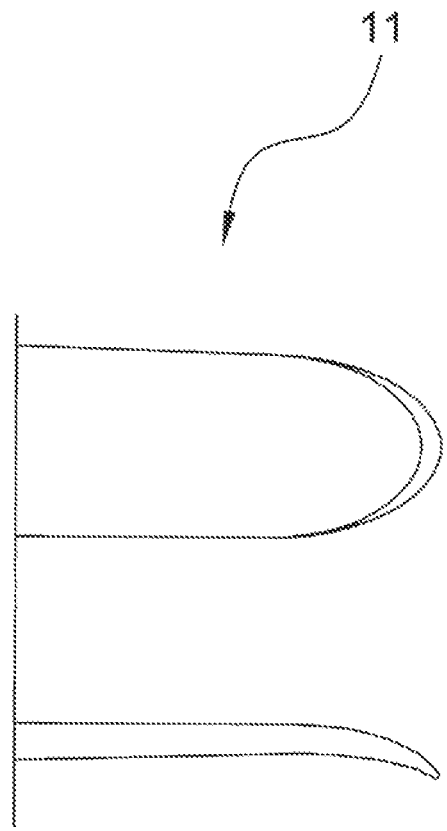
FIG. 4A shows a variation of the beak-opening blades of the device according to the principles of the present invention.
Figure 4B:
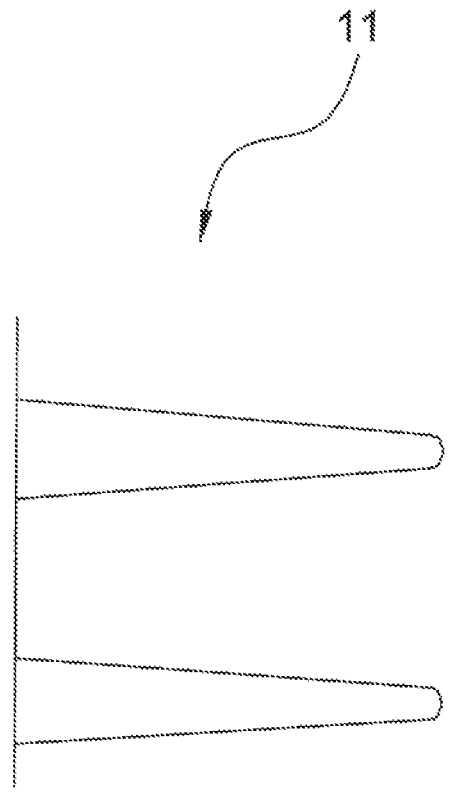
FIG. 4B shows another variation of the beak-opening blades of the device according to the principles of the present invention.
Figure 4C:
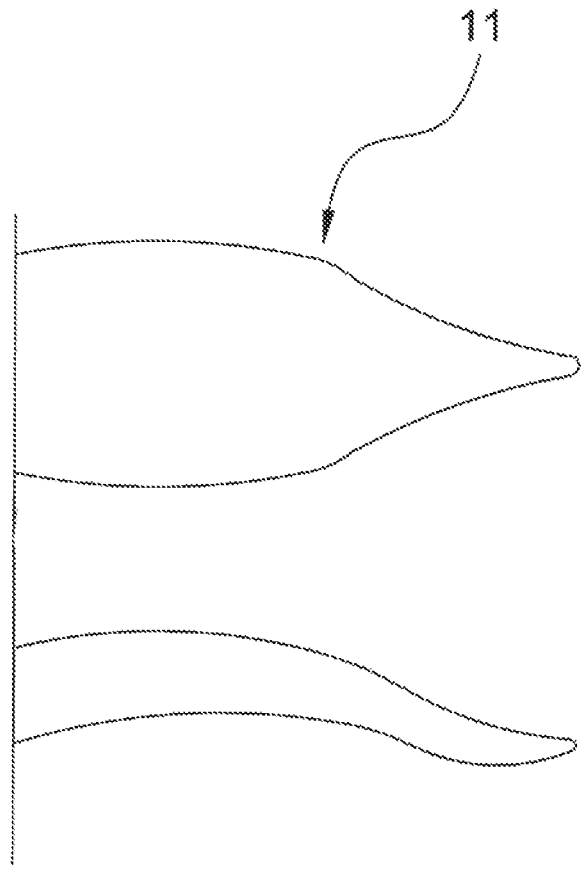
FIG. 4C shows another variation of the beak-opening blades of the device according to the principles of the present invention.
Figure 4D:
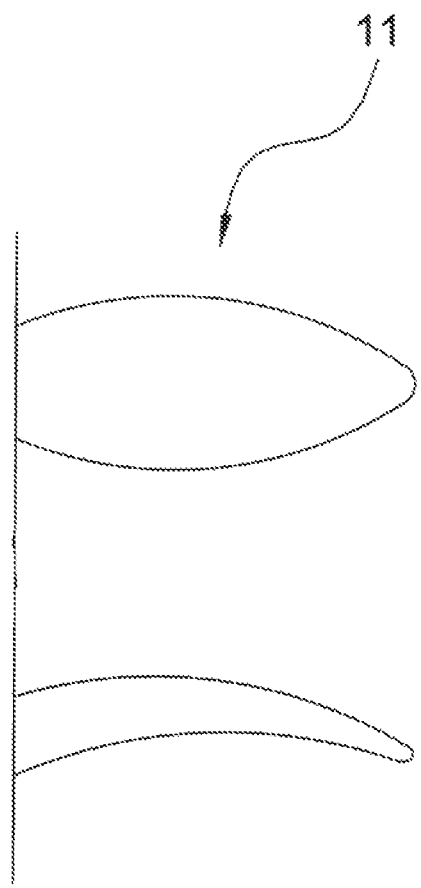
FIG. 4D shows another variation of the beak-opening blades of the device according to the principles of the present invention.
Figure 4E:
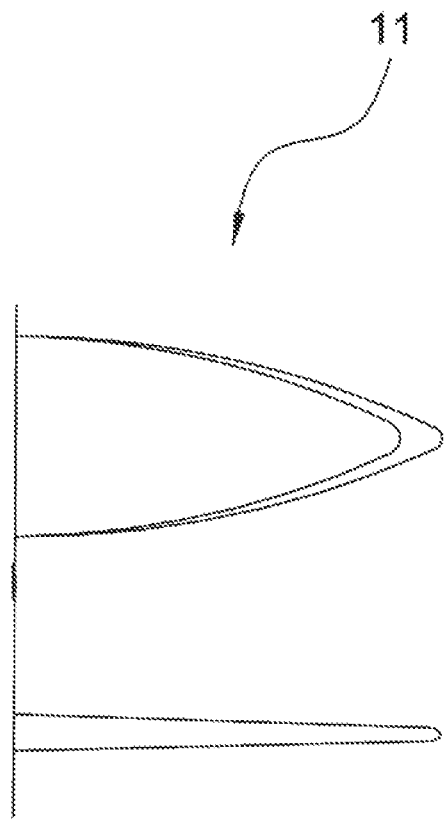
FIG. 4E shows another variation of the beak-opening blades of the device according to the principles of the present invention.
Figure 4F:
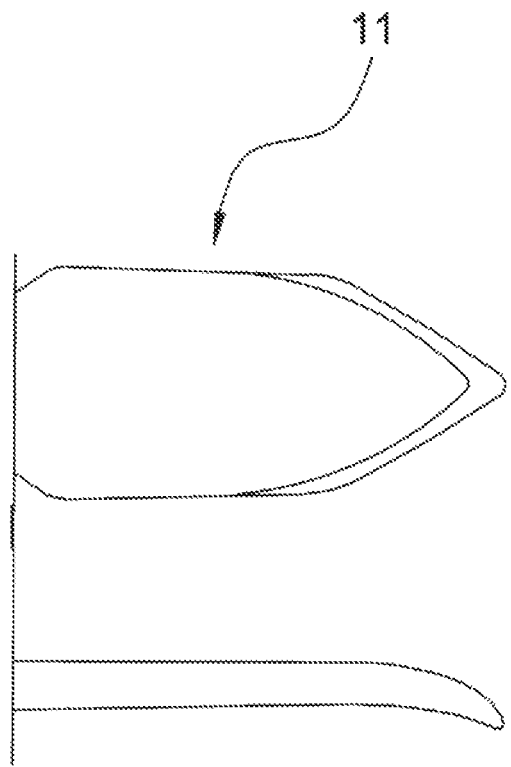
FIG. 4F shows another variation of the beak-opening blades of the device according to the principles of the present invention.
Figure 4G:
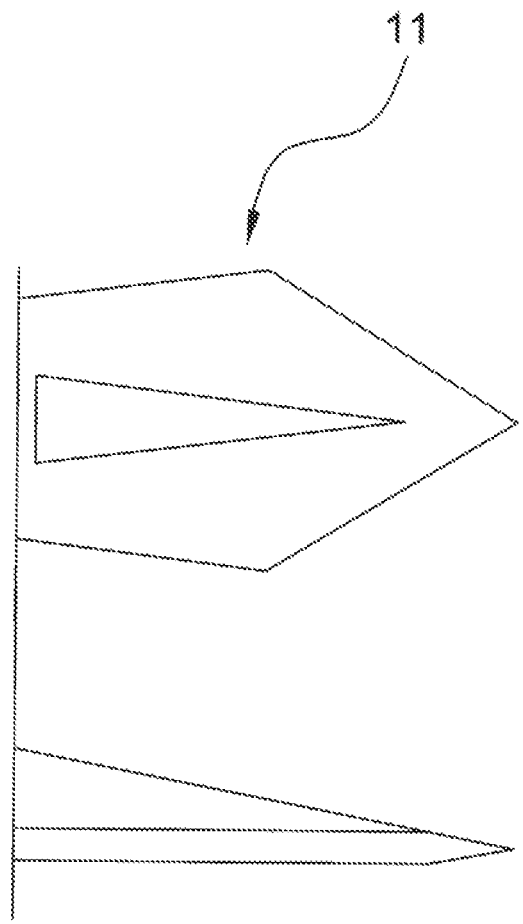
FIG. 4G shows another variation of the beak-opening blades of the device according to the principles of the present invention.
Figure 4H:
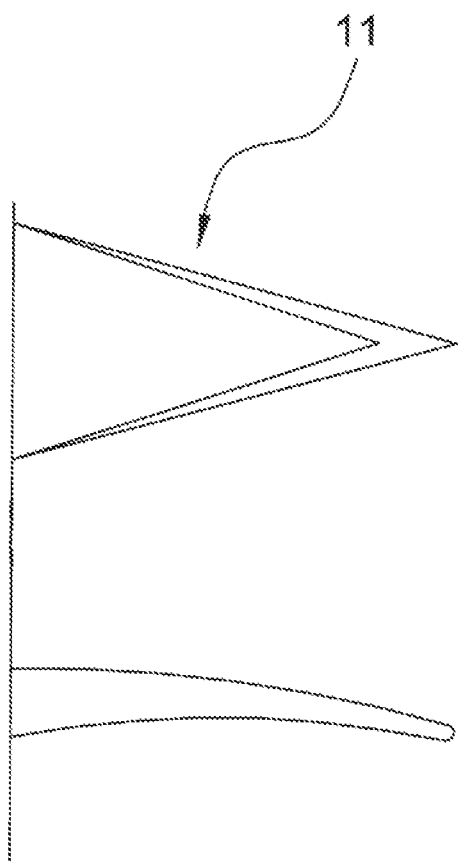
FIG. 4H shows another variation of the beak-opening blades of the device according to the principles of the present invention.
Figure 5A:
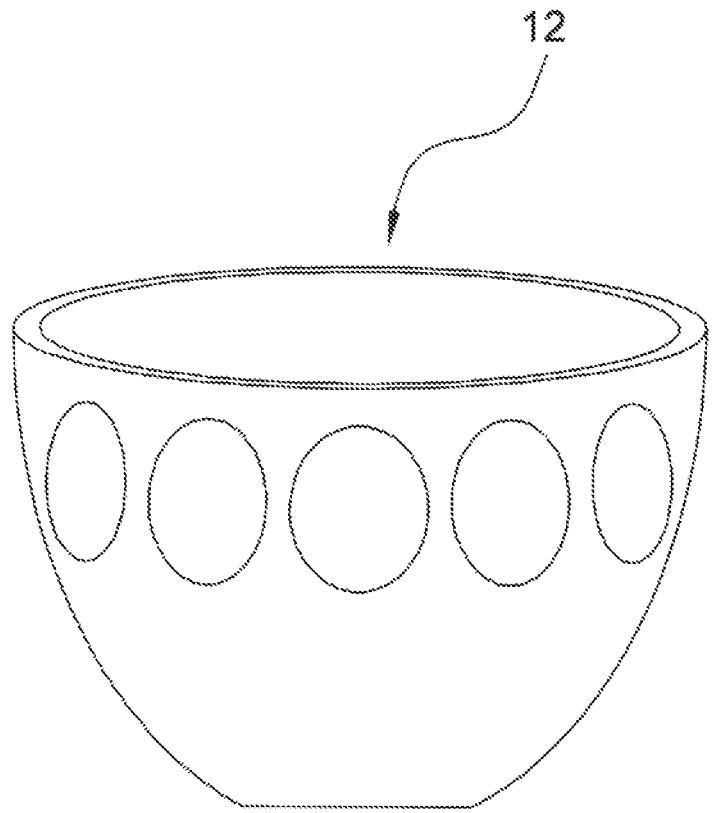
FIG. 5A shows a protective retaining cup of the device according to the principles of the present invention.
Figure 5B:
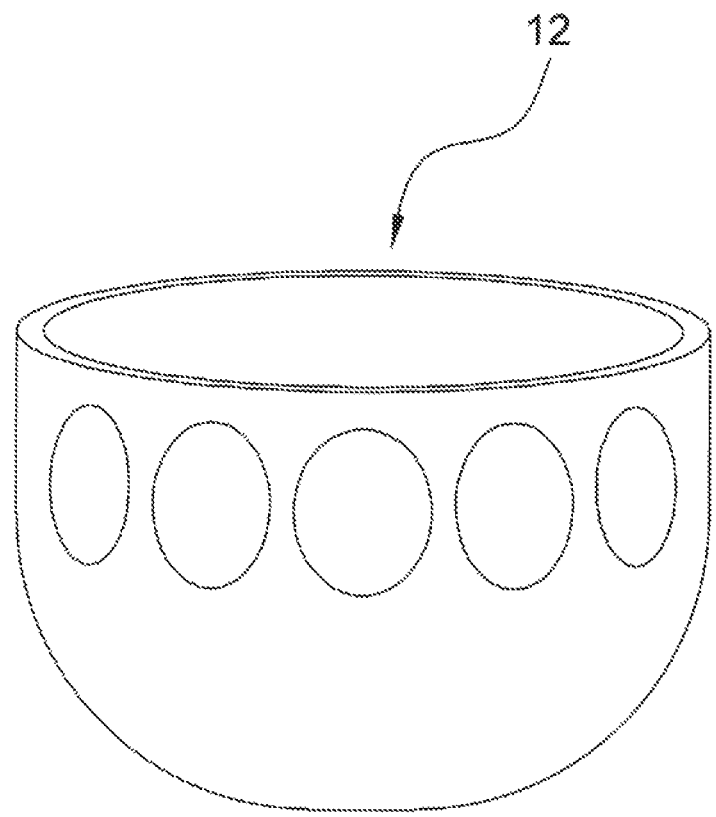
FIG. 5B shows another variation of a protective retaining cup of the device according to the principles of the present invention.
Figure 5C:
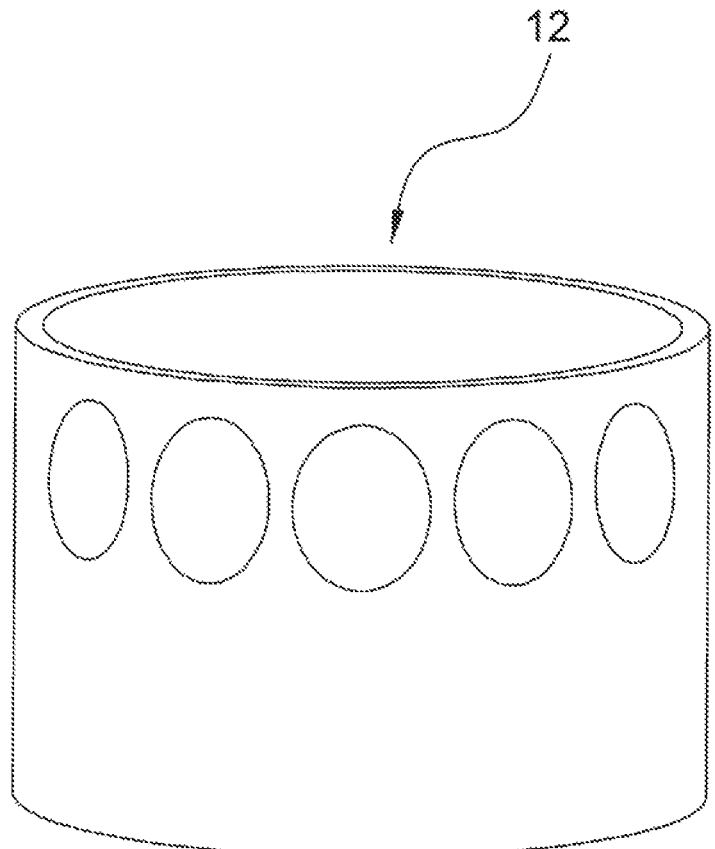
FIG. 5C shows another variation of a protective retaining cup of the device according to the principles of the present invention.
Figure 5D:
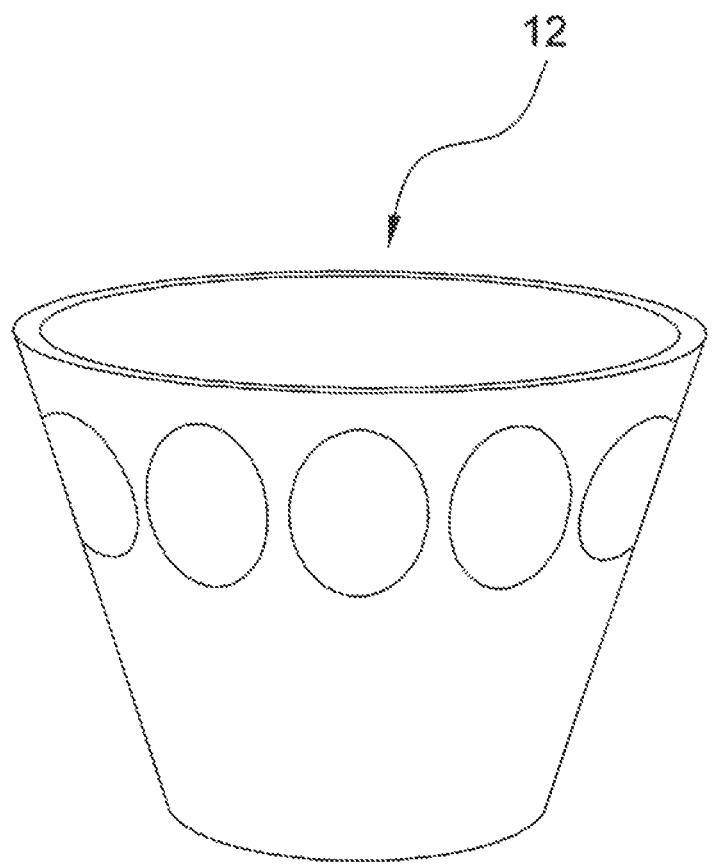
FIG. 5D shows another variation of a protective retaining cup of the device according to the principles of the present invention.
Figure 5E:
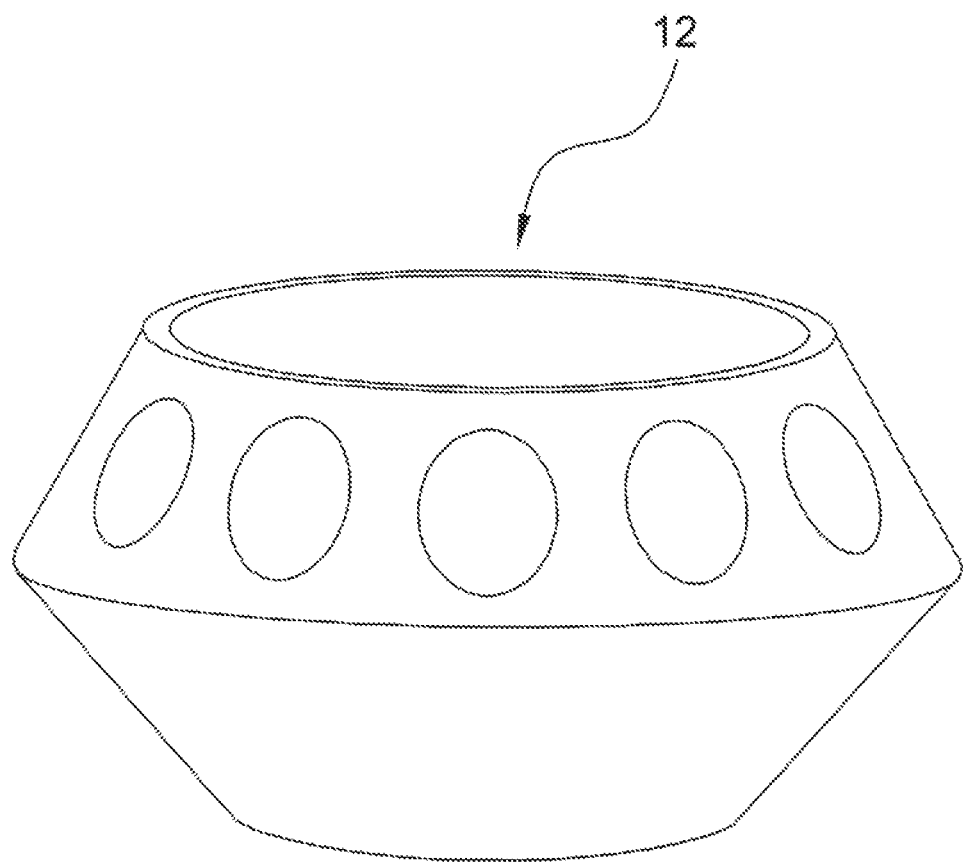
FIG. 5E shows another variation of a protective retaining cup of the device according to the principles of the present invention.
Figure 5F:
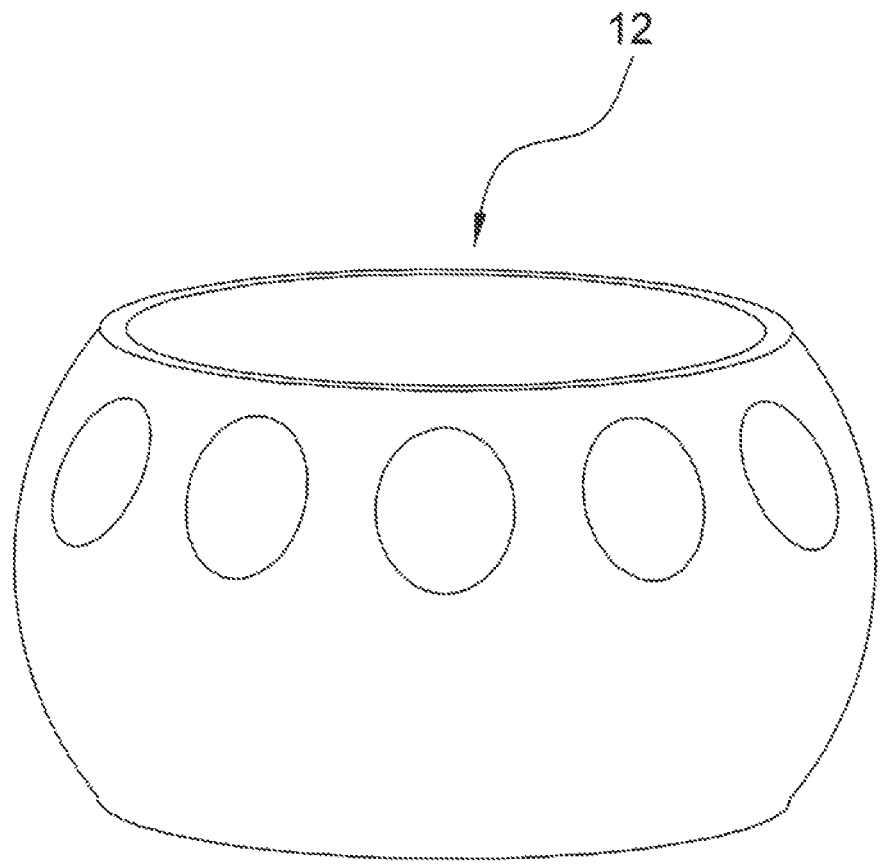
FIG. 5F shows another variation of a protective retaining cup of the device according to the principles of the present invention.
Figure 6A:
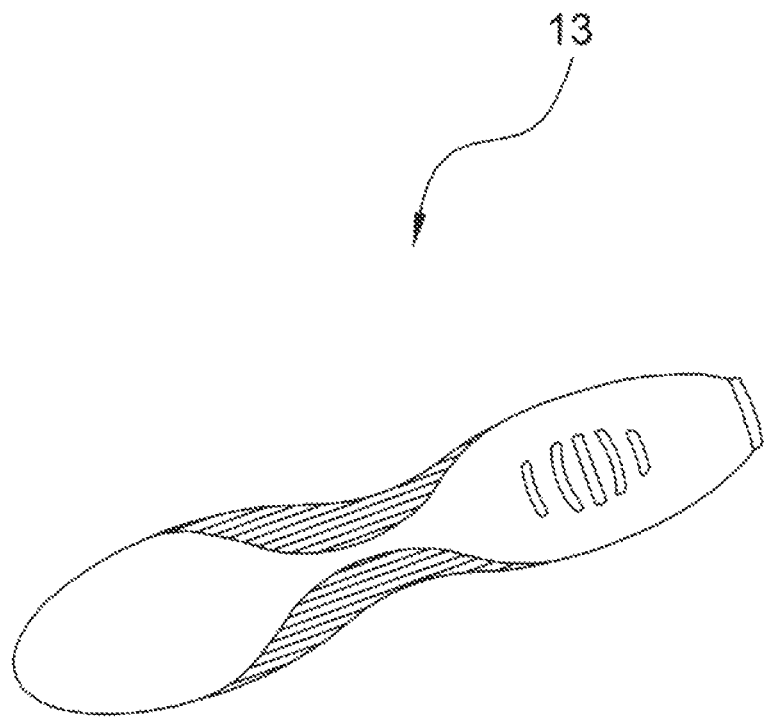
FIG. 6A shows a variation of the handle of the device according to the principles of the present invention.
Figure 6B:
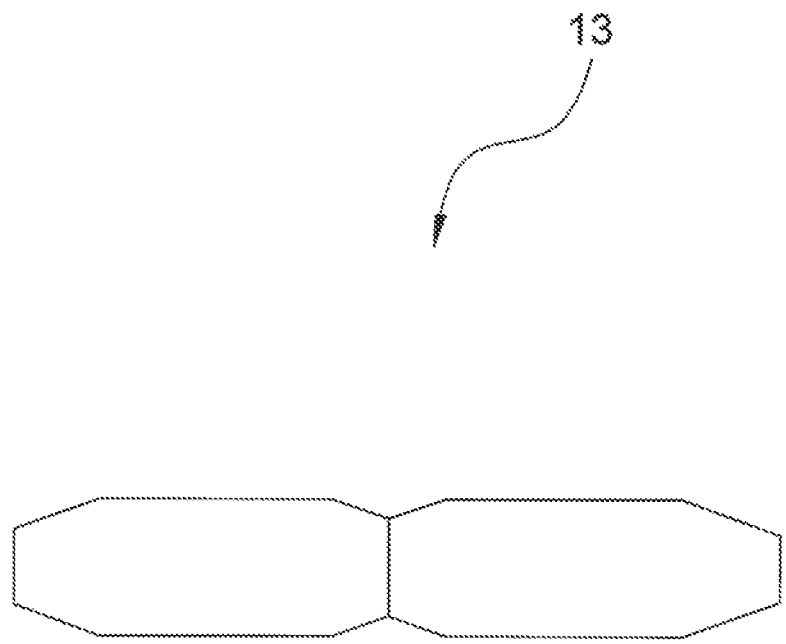
FIG. 6B shows another variation of the handle of the device according to the principles of the present invention.
Figure 6C:
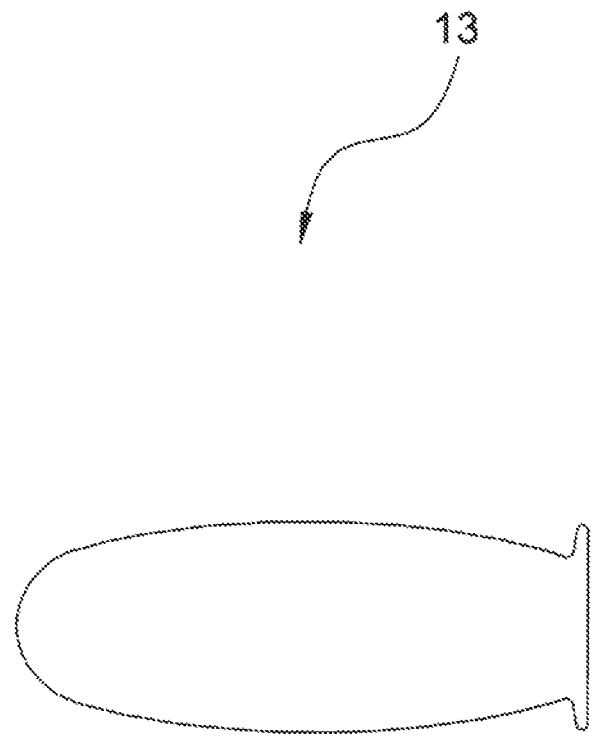
FIG. 6C shows another variation of the handle of the device according to the principles of the present invention.
Figure 6D:
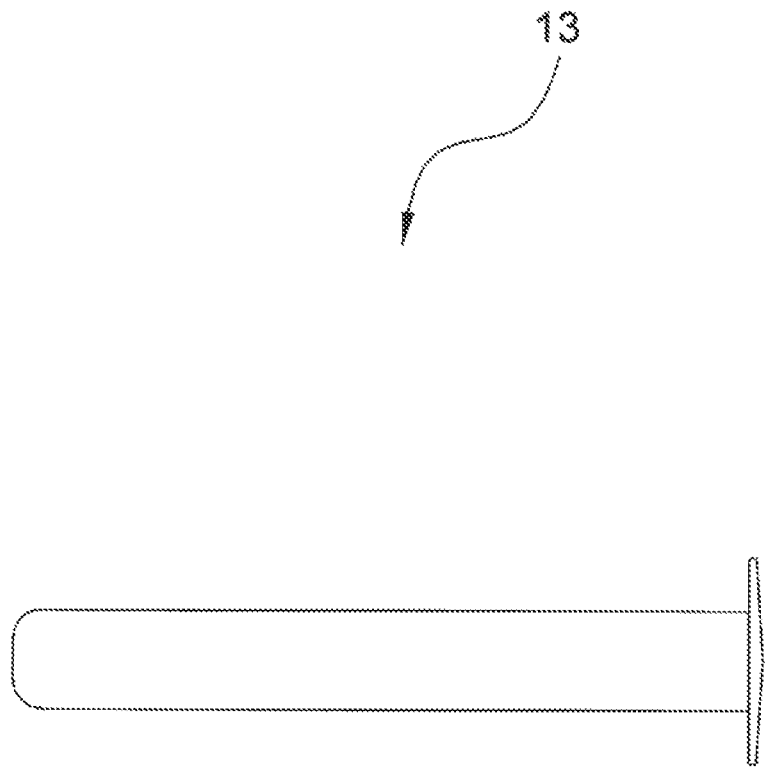
FIG. 6D shows another variation of the handle of the device according to the principles of the present invention.
Figure 6E:
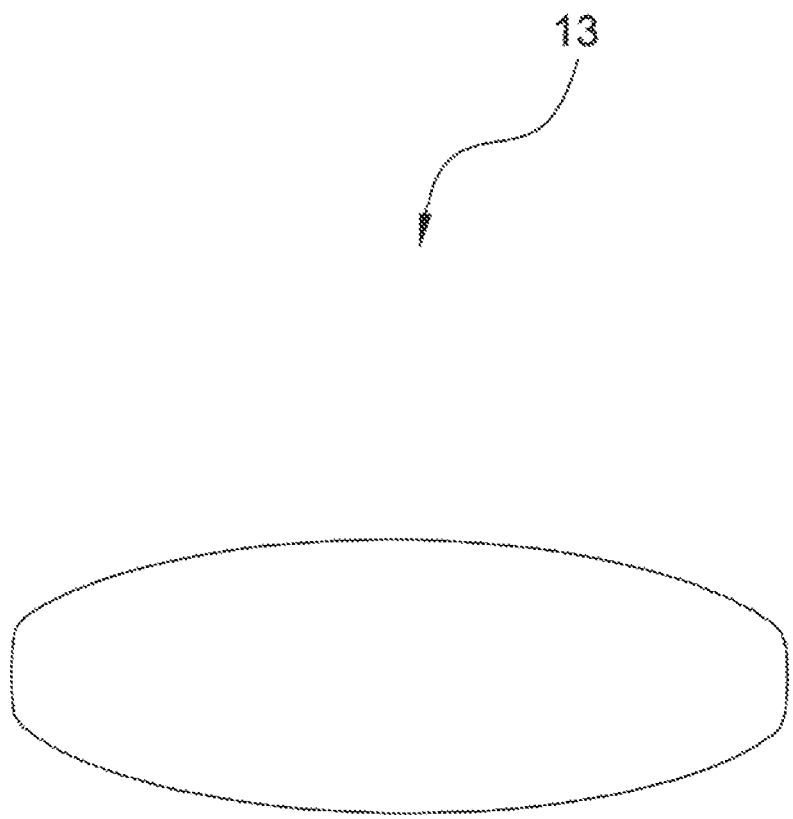
FIG. 6E shows another variation of the handle of the device according to the principles of the present invention.

Referring to FIG. 2A, there is disclosed a perspective view of a hand held device 10 for opening oysters which has a short beak opening blade 11, a cup-like element 12, and a handle 13 in accordance with the principles of one embodiment of the present invention. FIG. 2B and FIG. 2C show varying perspective views therein. The cup-like element 12 that connects to the front end of the handle 13 surrounds the beak opening blade 11 so as to gather the oyster's liquor and prevent the beak opening blade 11 from directly contacting user's supporting hand during the oyster opening process. The handle 13 has a containment area 14 therein to temporarily store the oyster's liquor collected by the cup-like element 12 while opening the oyster. Referring to FIG. 3, there is disclosed a sectional view along the line 2A-2A of FIG. 2A showing the containment area 14 within the handle 13.

The short beak-opening blade 11 may be constructed to be thicker, materially stronger, more efficiently contoured and with a more pointed and aggressively sharpened blade tip than is common on typical oyster knives. Referring to FIG. 4A-FIG. 4F there are disclosed a variety of beak-opening blades according to the principles of the present invention. One advantage of a short beak-opening blade is that the closer the tip of such a beak-opening blade is to the user's operating hand (that is the hand gripping the handle of the device), the more situational awareness the user experiences and the greater the physical control over the blade tip the user may bring to bear and hence the more confidence, accuracy and aggressiveness the user can bring to bear while prying open the oysters beak. Additionally, because the beak-opening blade is shorter than is a standard oyster-knife's blade it does not permit too much in the way of flexing along its length, meaning less energy is lost to mechanical flexing resulting in more of the users energy that can go into the direct force that the user can apply to the short blade towards prying open the oysters cartilage filled beak-section. To prevent injury to the user a dedicated beak-opening blade should be not too much longer than the beak-channel length of a typical, commercially vended oyster, about half an inch. Of course a much longer blade can be easily and effectively be utilized as a beak-opening blade provided that the longer blade's 'tip section' is the only part of that longer blade that is allowed to protrude from the inside base of a cup that is affixed to the handle of such a beak-opening device. In that case the tip section of a longish blade, if allowed to protrude from the inside base of the devices cup only a short-distance out, while also being firmly supported and buttressed around its exit plane perimeter within a open slot in that cup would, in effect, act and also function as the equivalent of a 'short' beak-opening blade.

The cup element 12 for gathering and retaining an oyster's liquor while acting as a protective cup may have different shapes. In one embodiment, the cup element 12 is an oval or circular shaped solid cup (FIG. 2A) like an egg cup or is a circular or an oval shaped wire-formed cage. The cup element 12 is connected to the front end of the handle 13 of the device and which is sufficient in depth and diameter to surround and loosely encase the upper base of the oysters beak section, and thereby entirely preventing the oyster from slipping free of the said cup's inside walls and upper rim 15 while the oyster is being manipulated and while the oyster's beak section is being pried-open by the oyster-opening blade 11.

Figure 12:
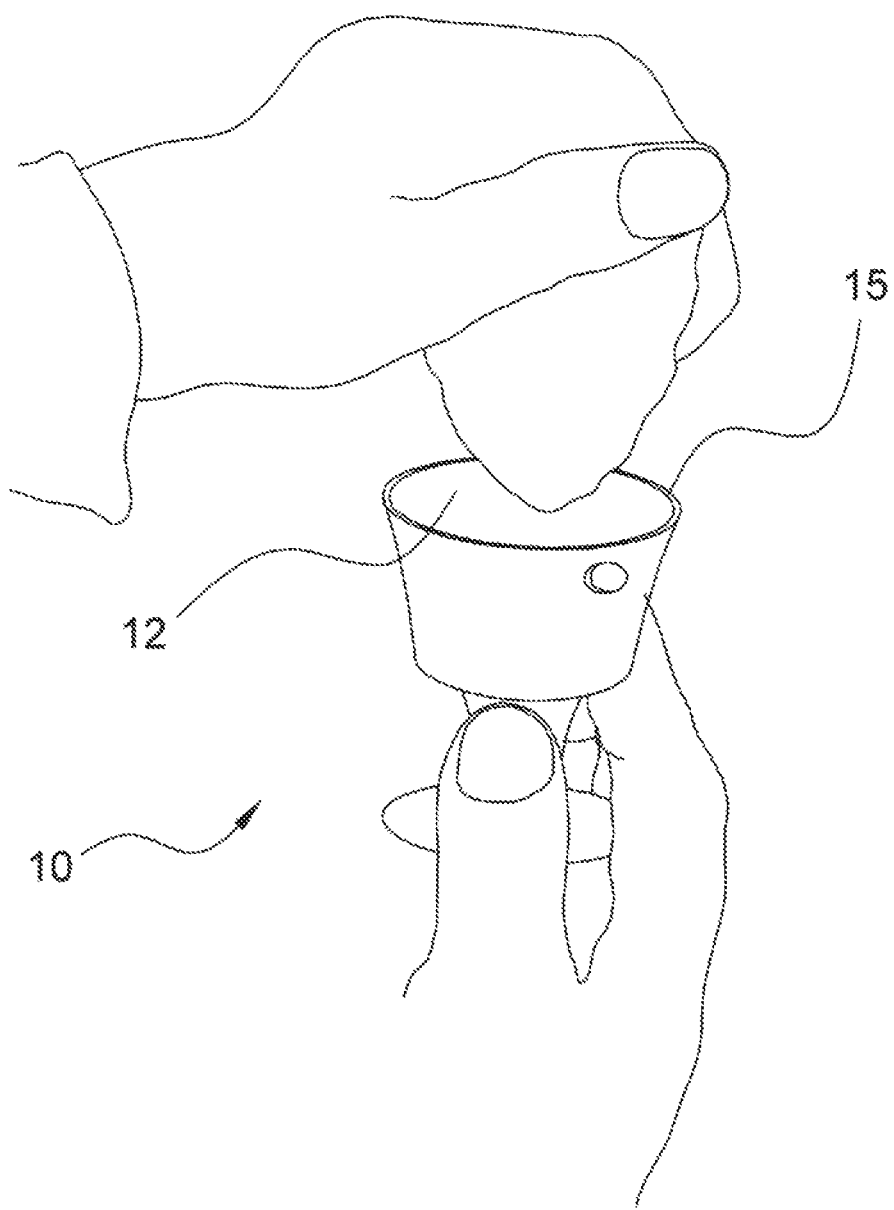
FIG. 12 shows a perspective view of a user using the oyster's beak opening and oyster liquor collecting device to pry open the oyster's beak.
Figure 13:
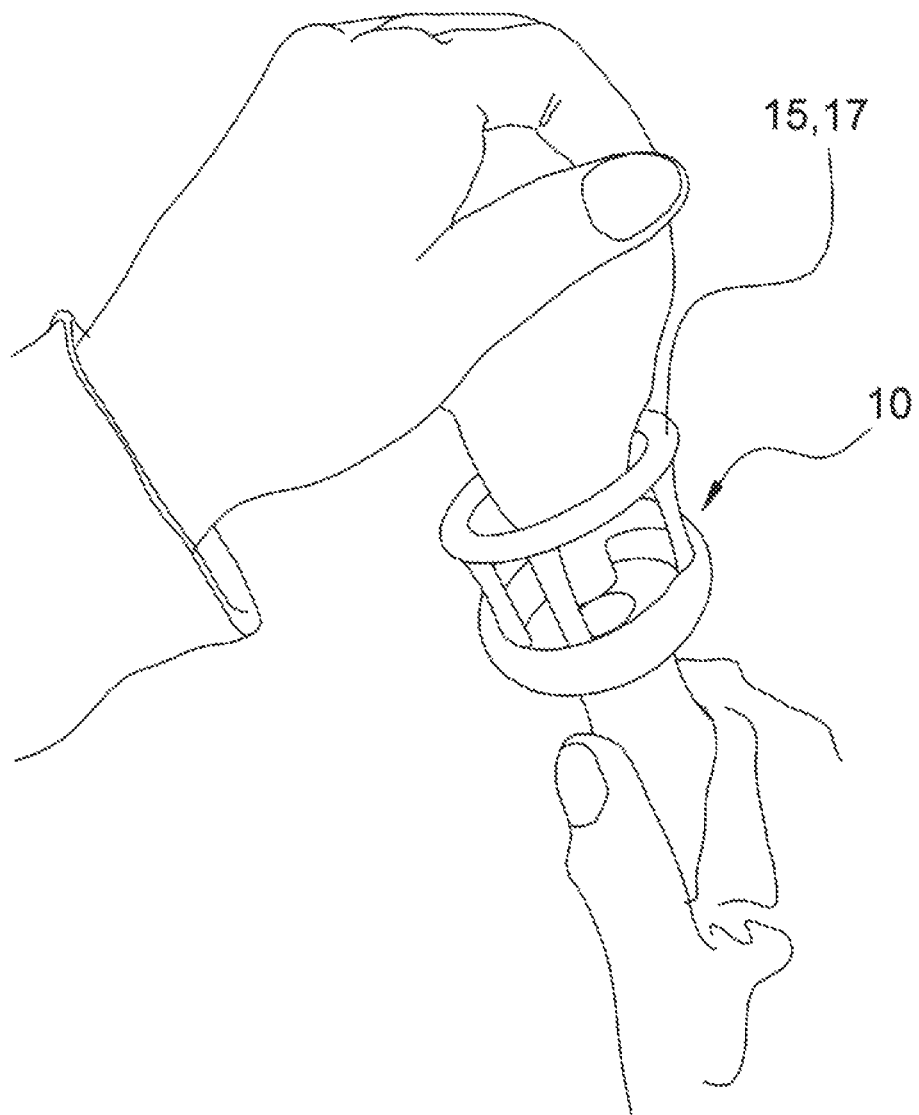
FIG. 13 shows a perspective view illustrating the upper rim that under certain circumstances could be employed as a leveraging fulcrum to help open the oyster's beak.

The cup element 12 is designed to catch and contain the oyster's liquor as the oysters beak is pried open. The oyster's liquor that is captured by the cup can be later transferred back to the fully opened oyster or transferred to a convenient containment vessel and reserved for later use. The oyster's liquor that is captured by the cup 12 could also be channeled to a containment area 14 within the handle 13 where it could be temporally-stored for dispensing when required later on. Additionally the cup's upper rim 15 can be used as a leveraging fulcrum, thereby creating the opportunity for a bottle-opener effect as shown in FIGS. 12-13.

This cup element 12 can be fashioned in numerous ways, with numerous materials and in various topological configurations that are cup-like in nature. See FIG. 5A, FIG. 5B, FIG. 5C, FIG. 5D, FIG. 5E, FIG. 5F. The cup shaped element of the device is specifically for the purpose of collecting an oyster's consumable liquor during the process of opening the oysters beak section but by side effect it also acts as a safety component protecting the user from the potential for a self inflicted knife stabbing injury.

The cup element 12 of the present invention has several functional purposes. First, the cup element 12 is to help support the oyster in place as it's being pried-open by the beak-opening blade 11 that is recessed within such a cup 12. The upper rim 15 of the cup 12 provides contact points for the oyster to secure the oyster in place. Additionally, under some circumstances the cup's upper rim 15 might be employed to act as a kind of fulcrum, allowing a user to gain a leveraging advantage while attempting to pop the oysters beak-section in much the same way that a typical bottle-top opener functions.

Secondly, the cup 12 acts as container for reserving an oyster's liquor and preventing the unwanted loss via a spilling of the oyster's liquor. Thirdly, the cup element 12 serves to prevent the beak-opening blade from slipping out of, or off of the oyster being opened in order to protect the user's supporting hand from being contacted and punctured by the short beak-opening blade. Fourthly, the cup element 12 prevents that beak-opening blade's sharpened tip from coming into contact with a person, regardless of whether or not the device is being used to open an oyster or simply being handled or transported. In this last regard of storage and transport the cup 12 is not functioning as an active knife-guard but instead is acting as a permanent, protective sheathing element surrounding the short beak-opening blade keeping a user safe while, for instance, the device is being casually handled or as it is in transit. 11.

A means known to anyone skilled in the art to add a feature to the cup 12 which would allow the channeling of the oyster's liquor from the cup into an interior holding space within the body of the handle 13 from which the oyster's liquor can later be poured. Such a containment area 14 within the handle 13 of the device could be of sufficient volume to hold the consumable liquor from many dozens of oysters. See FIG. 3.

The cup element 12 is defined as a cup or a bell-cup like appendage, which could take the form of an solid cup (FIG. 2A), a wire-formed cage, a basket of woven wire, an arrangement of tubing, a short section of open-tube or any other arrangement of sufficiently strong materials that would create a topologically bell-cup-like contrivance. A strong and high-impact resistant plastic-cup could be utilized or any cup-like contrivance which could be statically connected to the beak-opening knife-blade at one end of the devices handle.

In the case of a solid cup (see FIG. 2A) a series of small holes or 'viewing portholes' 16 could be opened within areas around the circumference of the cups upper body which would serve to allow a user to see and visually monitor the beak-opening blade. One or several holes would allow the user to more easily visually align and then manipulate the physical orientation of the oysters beak-section as the user's supporting hand manipulates the oyster while the user applies twisting and forwarding pressure to the beak-opening blade. See FIG. 2A and FIG. 5A, FIG. 5B, FIG. 5C, FIG. 5D, FIG. 5E, FIG. 5F.

The top surface of the cup's upper open rim 15 ideally would be rounded and smooth for functional reasons, such as to ease the contact and movement of the rough exterior shell of an oyster as the user positions and moves the oyster with that smooth rim reducing any friction caused by an oysters rough edged shell that is in contact with it, or in the case of that rim coming into hard-contact with a users supporting hand for which contact with a smooth rim would be less likely to cause an abrasion to the user. The static connection between the beak-opening blade 11 and the handle 13 can include an arrangement whereby the blade 11 itself is allowed to rotate, wiggle and move forwards and backwards within the cup 12 while being statically connected to the handle 13 by way of a mechanical-linkage and O-ring style assembly that would serve to prevent the collected oyster's liquor from exiting the cup's base during the process of manipulating the beak-opening blade. The diameter of the cup's upper rim 15 and the cup's depth from the upper rim 15 to its base 25, would be sufficient to accommodate an average-sized oysters beak-end to a depth sufficient to allow the beak-opening blade to penetrate the entire oyster-beak's cartilage-filled hinge-channel and to simultaneously keep the beak-section of the oyster from slipping from and then leaving the confine of the protective retaining cup's interior sides and rim as the oyster and the beak-opening blade are being manipulated by a user during the process of opening the oysters beak.

Figure 7:
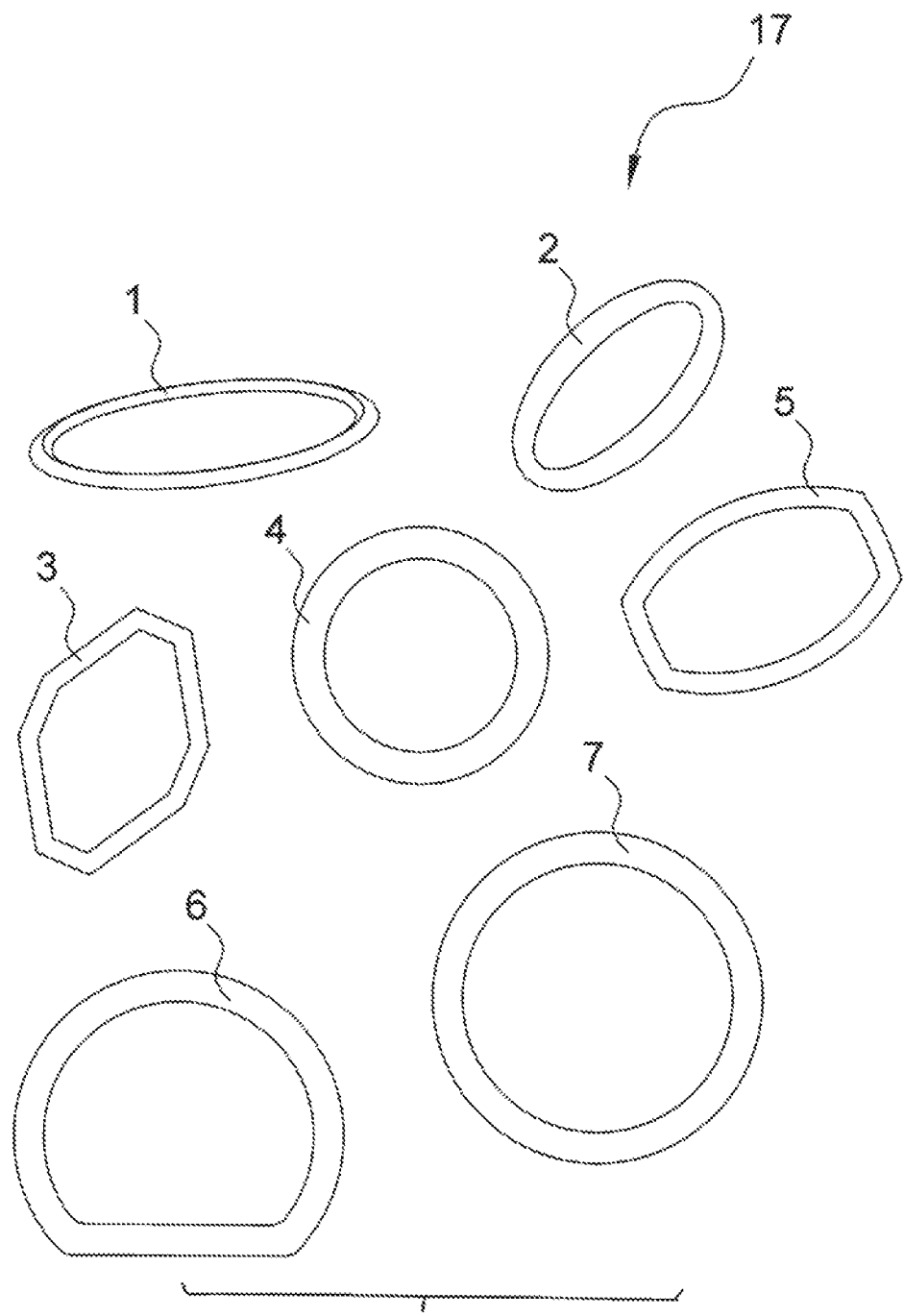
FIG. 7 shows numerous ring elements of the device according to the principles of the present invention.
Figure 8:
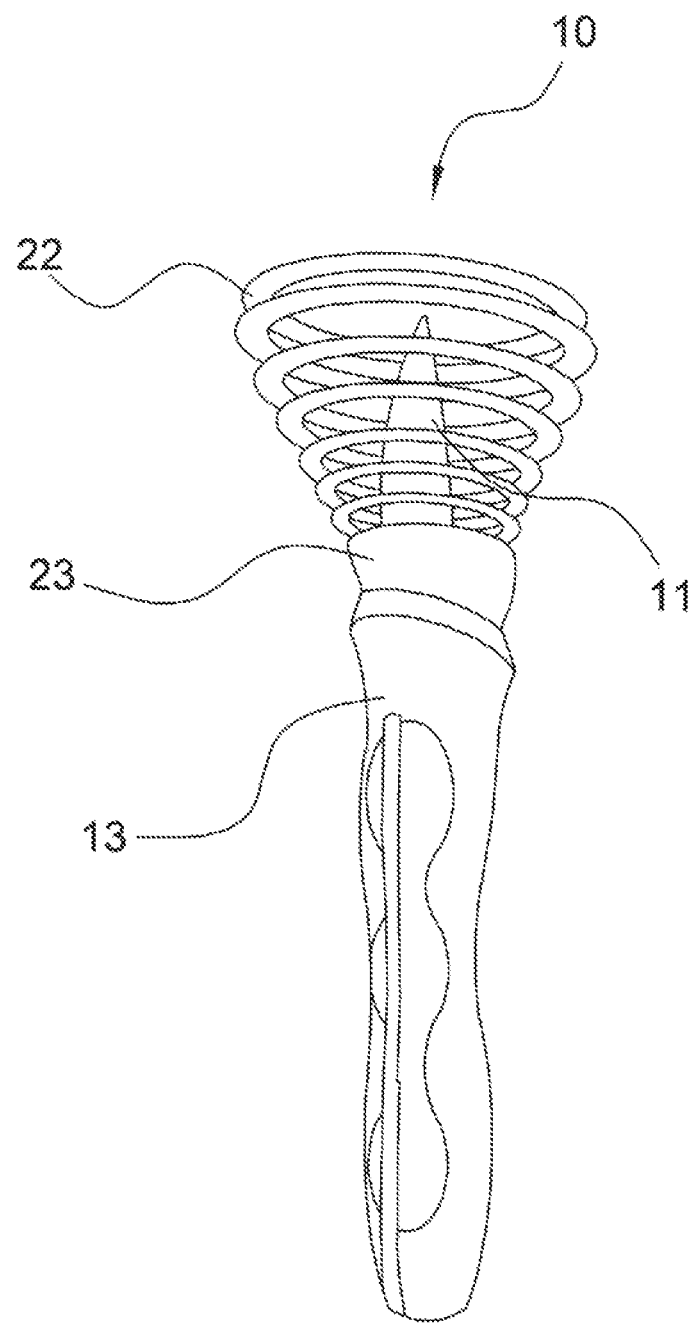
FIG. 8 shows another embodiment of the protective retaining cup of the device according to the principles of the present invention.

In another embodiment, the protective retaining cup 12 could be fashioned to employ an open steel ring or a ring like element 17 (FIG. 2B, FIG. 2C, and FIG. 7) with a diameter of around 2.4 inches more or less in order to emulate the solid cup's upper rim 15 that was discussed in the foregoing. Next would come the addition of several or more legs 18 that would connect said ring-like element 17 to a small platform 19 about an inch or so below it in such a manner to compile a single-unit that would emulate the topological-properties of a cup-like element but which would be skeletal and open. In this case the wire-frame cup would then be encircled at its bottom with an encircling-skirt 20 allowing this wire-frame cup to hold and to contain oyster's liquor. This assembly composed of platform washer 19, ring 17 and connective-legs 18 and encircling-skirt 20 would be affixed to the front end of the handle of the device mentioned above.

As shown in FIG. 2C, the device may further comprise a second ring 21 which can be positioned within the primary ring 17, with the second and smaller ring 21 provided through a movable mechanical connection to the primary-ring allowing the secondary ring 21 to be flipped out of and freed from the interior of the primary ring, thereby providing the user with a choice of different ring-diameters, either of which could be more properly matched to any particular oyster's general shell-width, with the smaller-diameter interior ring more suitable for the beak-opening smaller oysters, like for instance Olympia Oysters, and with the larger diameter upper ring more suitable for the opening of the beaks of larger oysters, such as the larger, wider Long Island Blue Points.

There are many and mechanically obvious and alternate ways to fashion similar cup-like contrivances that would serve the purpose of protectively cowling a short beak-opening blade to ensure that the beak-opening blade-tip does not come into contact with a users supporting hand during the opening of an oyster and to ensure that an oysters beak remains supported, captured and confined as it's being forcefully manipulated by a user engaged in the process of prying open the oysters beak. In fact there are multitudes of materials and material configurations that could create the desired functionally equivalent of a protective cup. For instance, a sufficiently thick and strong rod of some material, (metal or otherwise), could be frame-bent into a tapered-spring, with its widest-flair a diameter of around 2 inches or so and with its narrowest-flair an inch or so in diameter and with the gauge-thickness of the rod stock forming that tapered-spring 22 being about or less than a quarter of an inch in diameter in order to emulate an actual cups basic topological-features. For example, a tapered spring 22, a solid, one piece configuration with its top sufficiently wide in diameter, would like a more standard-cup be open and wide enough to support and retain an inch or so of an oyster's beak-section while also protecting a users supporting-hand. That tapered springs 22 more narrowly tapered base would be surrounded by an encircling-skirt 23 allowing the spring's base section to hold and to contain the oyster's liquor. It would then be connected directly to the front end of the handle 13 of the device itself thereby completing the entire beak-opening and liquor-collecting system.

An ergonomic, easy to hold handle 13 of the device of the present invention is equivalent in shape and size to those found on typical ergonomically designed oyster knives and common kitchen ware objects that utilize hand grips and handles. See FIG. 5A-FIG. 5F. The ergonomic handle 13 of the present invention can be held and grasped by the user to apply the pressured manipulations to a short, contoured and protruding beak-opening blade which may be statically attached to the front end of said handle. See FIG. 2A, FIG. 2B, FIG. 2C.

An ergonomic, easy to hold handle 13 may be attached at its front end to the back-side bottom of a protective cup. See FIG. 2A, FIG. 2B, FIG. 2C. A handle 13 that can be held and grasped by the user during the manipulations of the oyster and the oyster's beak-opening blade that is required during the opening of the oyster's beak. A hollow containment area within the handle could also act as a container for holding the oyster's liquor with a mechanical provision allowing the cup to funnel or to channel the oyster's liquor into such a containment area within the handle. See FIG. 3.

As mentioned above, this new device is specifically designed for collecting an oyster's liquor while safely opening and prying apart an oyster's beak section. The embodiments presented in the foregoing does not 'fully open' an oyster which is a process that requires an additional blade or element that a user employs to cut free an oyster's adductor-muscles after the oyster's beak has been pried apart and separated. The embodiments presented in the foregoing are referring to an oyster-liquor collecting and oyster-beak opening device.

Figure 9A:
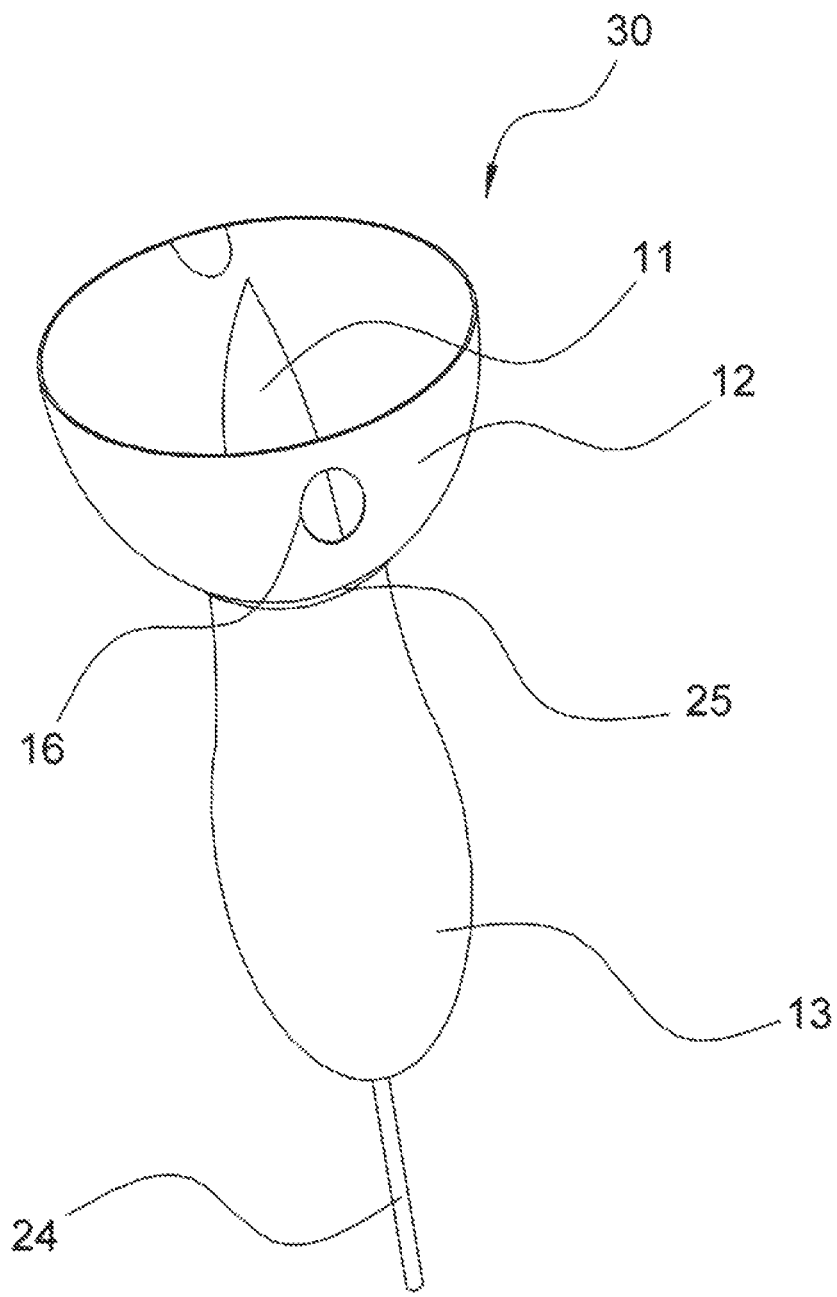
FIG. 9A shows a perspective view of the oyster's beak opening and oyster liquor collecting device supplemented by an additional adductor-muscle cutting blade according to the principles of the present invention.
Figure 9B:
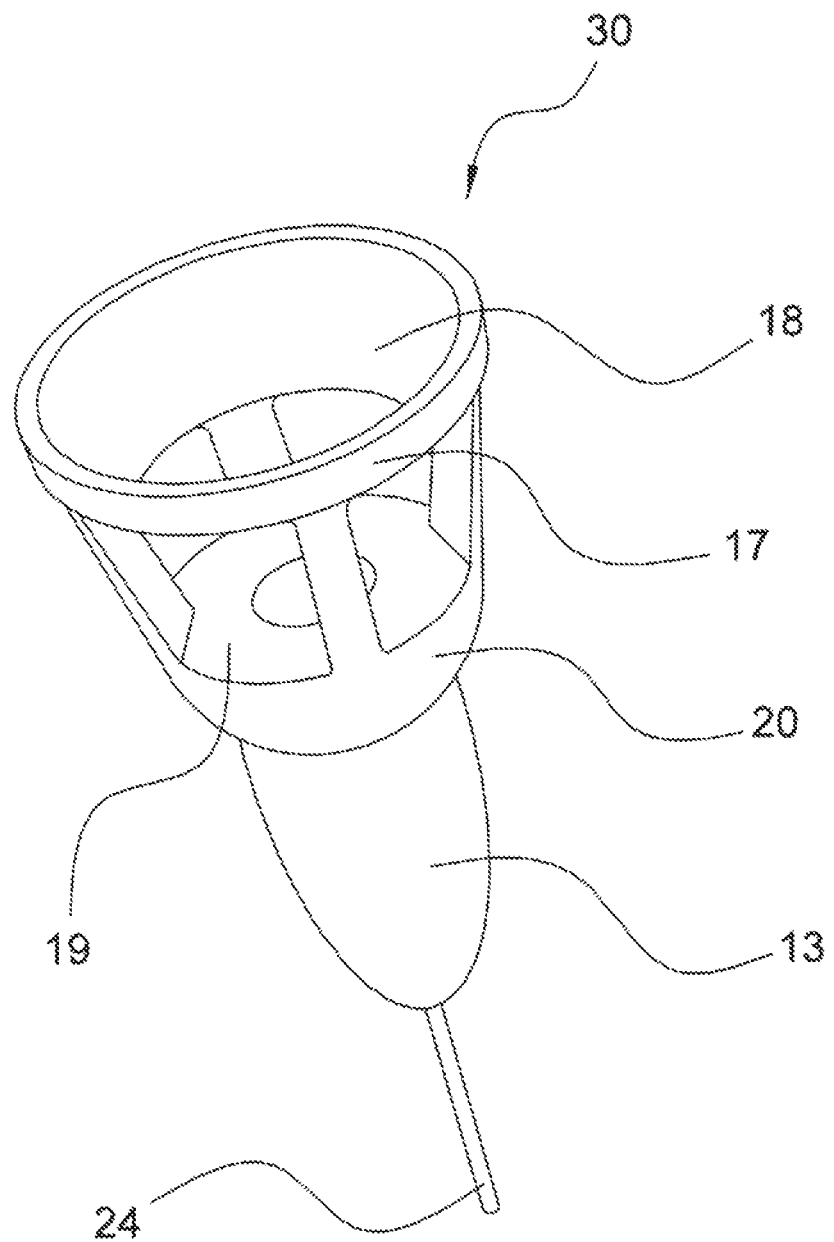
FIG. 9B shows another perspective view of the oyster's beak opening and oyster liquor collecting device supplemented by an additional adductor-muscle cutting blade according to the principles of the present invention.
Figure 9C:
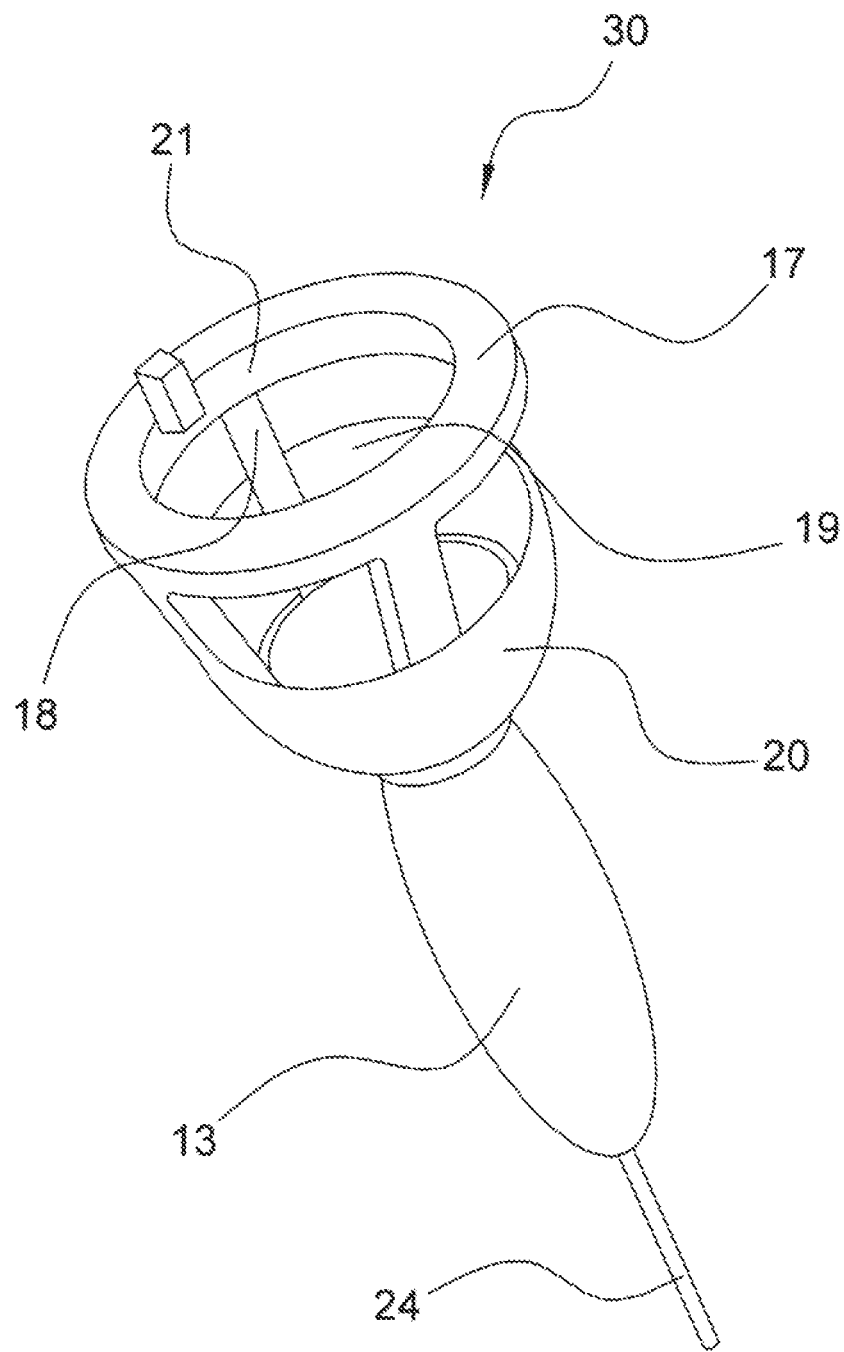
FIG. 9C shows another perspective view of the oyster's beak opening and oyster liquor collecting device supplemented by an additional adductor-muscle cutting blade according to the principles of the present invention.

In order to let the user cut free an oyster's two adductor-muscles thereby fully-opening the oyster, the oyster's beak-opening blade element and the devices oyster-liquor collecting cup element of the present invention is further modified to include an additional element, an adductor-muscle cutting blade. In one embodiment of the present invention 30, the device further comprises an additional adductor-muscle cutting blade 24 which is fully connected to the rear end of the handle 13 as shown in FIG. 9A, FIG. 9B and FIG. 9C. Other elements in FIG. 9A, FIG. 9B, FIG. 9C are the same elements discussed in FIG. 2A, FIG. 2B and FIG. 2C thus are not discussed again. The adductor-muscle cutting blade 24 may be statically attached to the rear end of the handle 13 or may be extendable and retractable through the guide channel inside the handle 13.

Figure 10A:
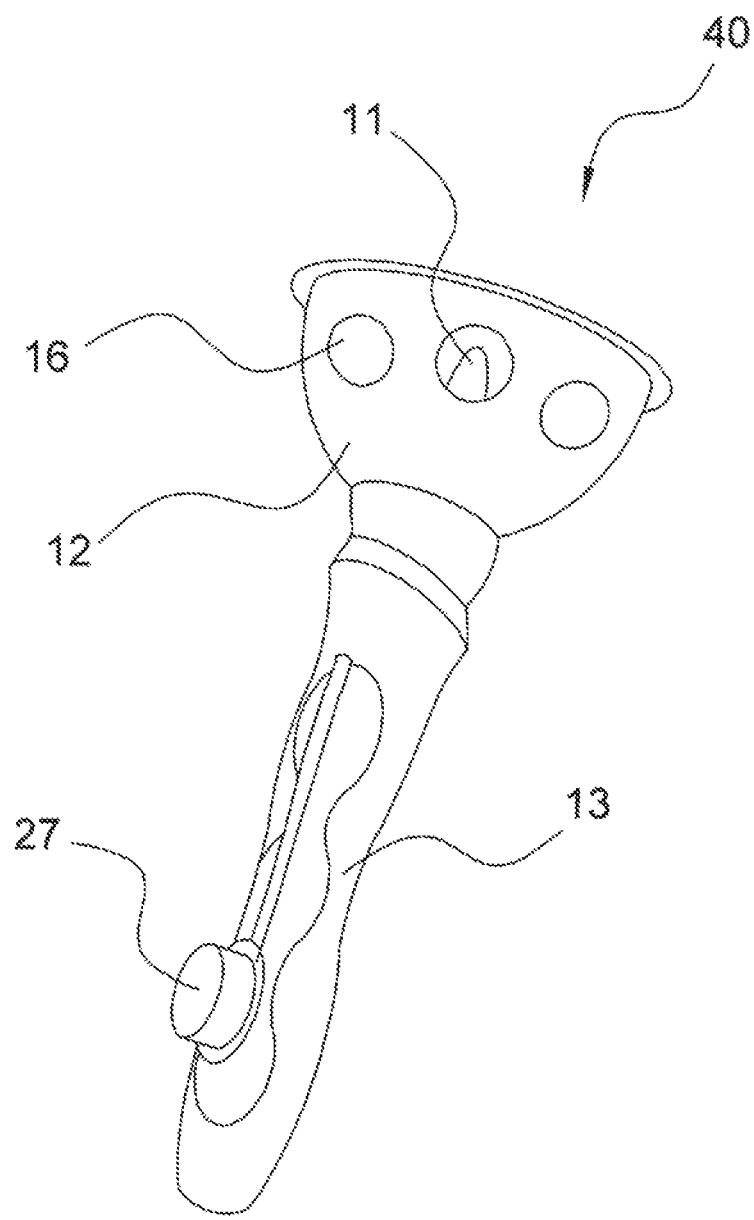
FIG. 10A shows a perspective view of the oyster's beak opening and oyster liquor collecting device plus an additional adductor-muscle cutting blade in a beak opening mode and an adductor-muscle cutting mode.
Figure 10B:
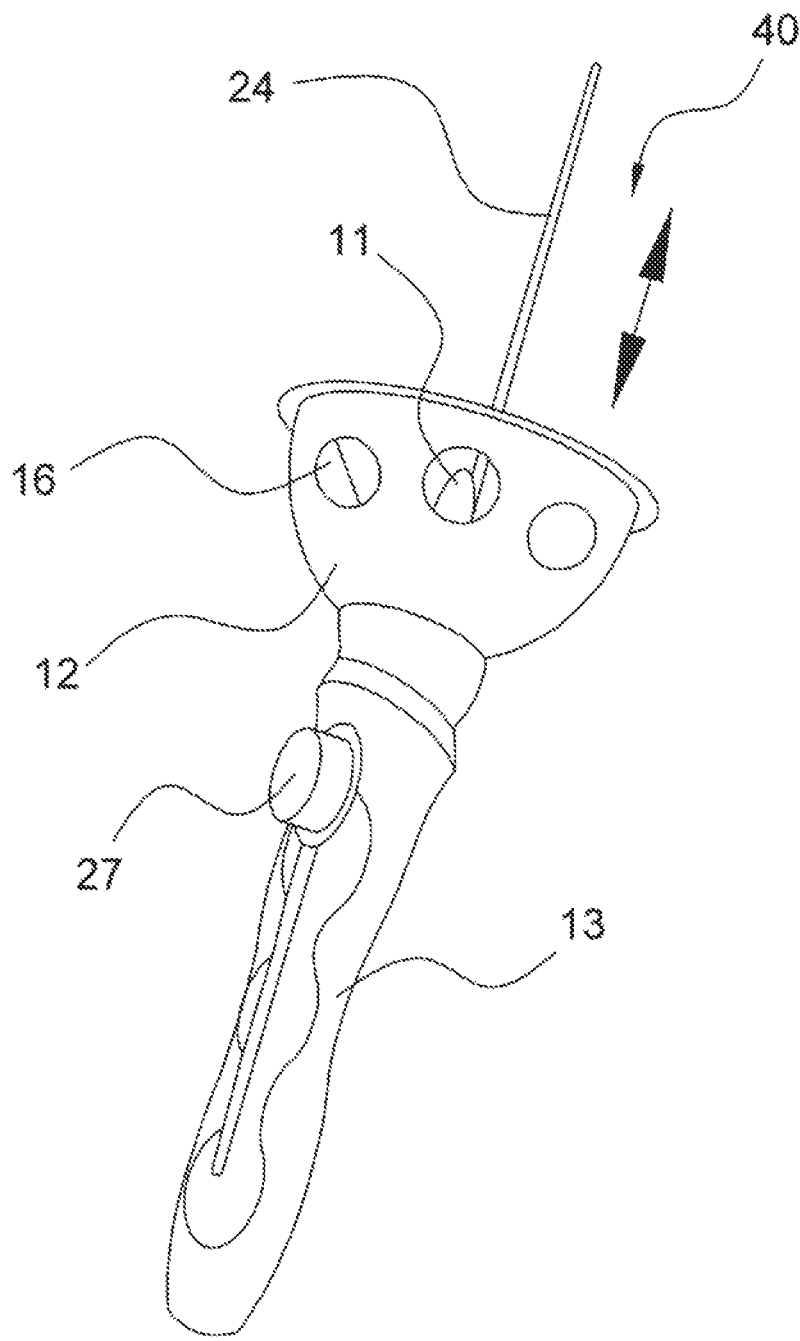
FIG. 10B shows another perspective view of the oyster's beak opening and oyster liquor collecting device plus an additional adductor-muscle cutting blade in a beak opening mode and an adductor-muscle cutting mode.

In another embodiment of the invention 40, the additional adductor-muscle cutting blade 24 is laid hidden in a grooved channel guide inside the handle when the device is being used to pry open the oyster's beak. After the oyster's beak has been opened the adductor-muscle cutting blade 24 is pulled from or pushed out of the handle via a mechanical means and then employed by the user to cut the oysters twin adductor-muscles. As shown in FIG. 10A and FIG. 10B, the adductor-muscle cutting blade 24 can be mechanically switched between its fully retracted position (that is the 'beak opening' mode of FIG. 10A) and its fully extended position (that is the 'adductor-muscle cutting mode' of FIG. 10B) by manually pushing, or conversely, by manually pulling the knob attached at the knifes rear base 27 back and forth. A flexible gasket or a narrow distance between the transmission-slot in the cup, the slot through which the adductor-muscle cutting knife blade passes when it is extracted from the handle of the device, and the sides of the adductor-muscle cutting knife blade allows the oyster liquor retaining cup to hold any captured oyster-liquor that is collected during the initial beak-opening process.

In an another embodiment of the invention 50, the beak-opening blade 11 could be extended in length but with the major portion of that additional length lying hidden in a recess and channel-guide situated within the handle of this device to be slid-forward and utilized as a long adductor-muscle cutting knife blade after the short exposed length that's used beak-opening section of such an extended blade had been initially used to pry open and pop the oyster's beak. As shown in FIG.

Figure 11A:
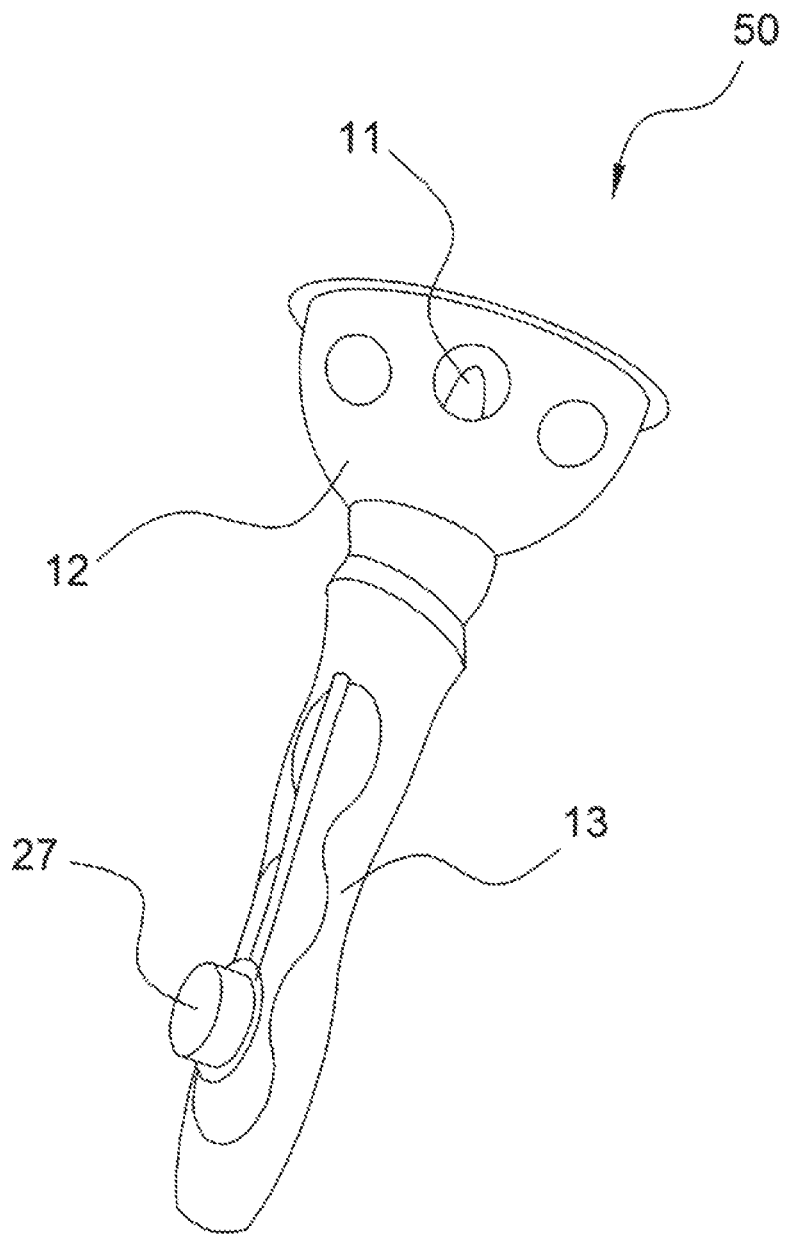
FIG. 11A shows a perspective view of the oyster's beak opening and oyster liquor collecting device according to the principles of the present invention wherein the oyster's beak-opening blade is retracted.
Figure 11B:
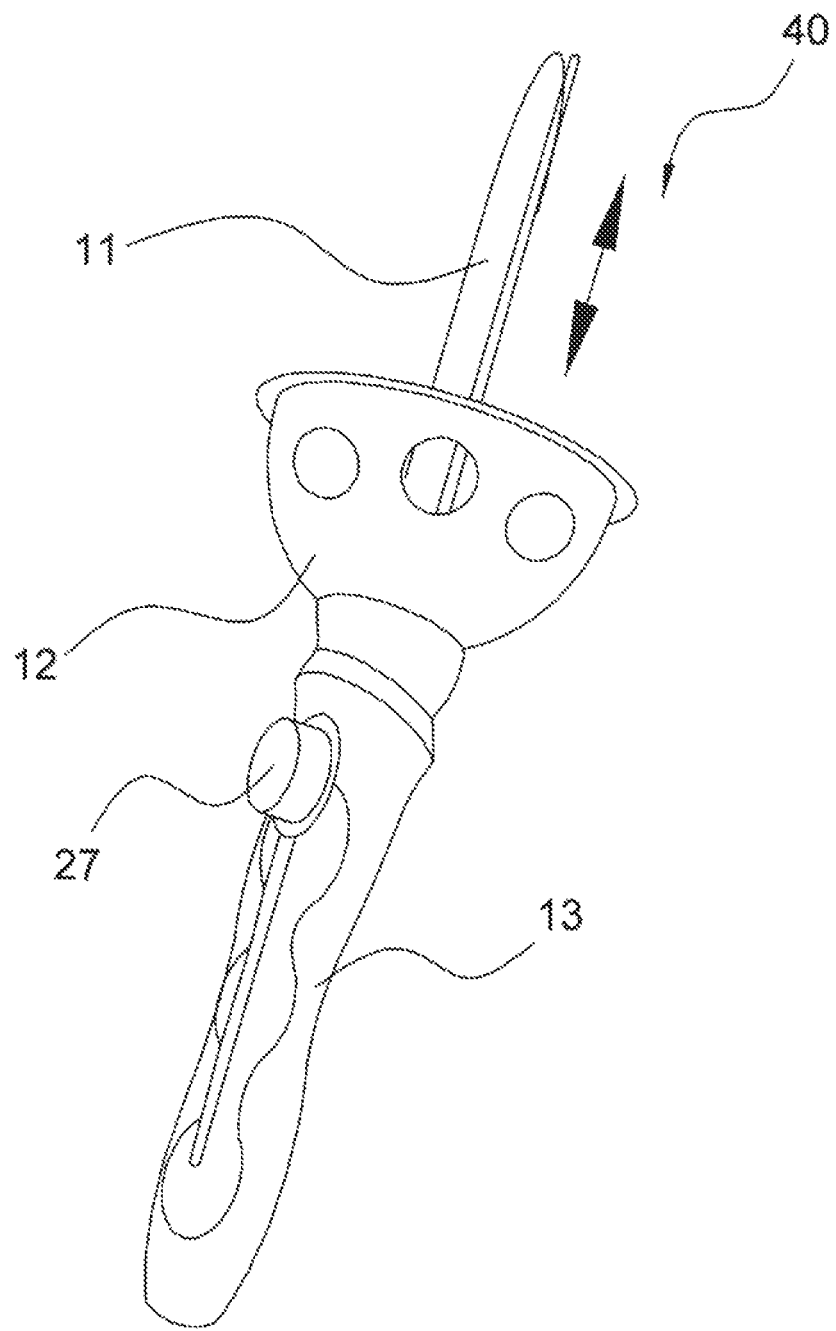
FIG. 11B shows a perspective view of the oyster's beak opening and oyster liquor collecting device according to the principles of the present invention wherein the oyster's beak-opening blade is extended.

11A and FIG. 11B, the beak-opening blade 11 can be converted between its fully retracted position, (that is the short 'beak opening' mode of FIG. 11 A), and its fully extended position, (that is the longer 'adductor-muscle cutting mode' of FIG. 11B), by manually sliding the knob 27 back and forth. Alternatively, the conversion of the modes can be controlled by other mechanical means, for example, by spring loaded ejection or by the depression of a tension creating button which could drive the knife forward.

As a result of these specific modifications the embodiments of the new and novel device could be technically referred to as an "oyster's liquor collecting and oyster opening device".

In use, a user would use this oyster opening device in much the same way that he or she would employ an ordinary oyster knife but with a few basic differences. One positive difference would be that the user, upon actually opening the oyster's beak-section, could pour the oyster's liquor from the oyster itself into the devices frontally open cup which would act as a container while preventing unwanted spillage of the oyster's liquor during the beak-opening process. Another difference would be the process of cutting free the oyster's adductor-muscles after the oyster's beak-section has been opened by this device. Using this device the user would employ a second and separate knife or separate and additional-element that would be used, after the beak-opening knife had performed its function of opening the oyster's beak, to cut free the oysters adductor-muscles. That secondary blade or additional element which would be used to cut the oysters twin adductor-muscles could in fact be an integrated part of this beak-opening system, provided as an add-on and residing at some point of the systems handle, or folded about the exterior of the devices handle where it could be mechanically extended, or it could be stowed away internally within the handle to be pulled out or spring ejected when required as needed, specifically after the beak-opening knife had performed its primary task. Another difference would be that the user would be free to apply far more liberal pressure to the beak-opening blade during the beak opening process as well as performing faster, more aggressive and more pressurized manipulations to the beak opening knife blade and to the oyster itself via the user's supporting hand during the process of opening of the oysters beak-section. The reason being that the user, knowing that he or she is safely-protected by the liquor gathering protective cup from a potential stabbing or from an accidental puncturing created by an errant move of the beak-opening knife blade, would be far more free to employ greater pressures to the beak-opening blade and also be encouraged to attempt more generally aggressive knife manipulations and shucking moves while opening the oyster with this beak-opening device than he or she would consider doing with a standard oyster knife where the potential for an accidental hand-stabbing injury would be a common operating factor.

In an embodiment the device further has a vertical opening from the top of the cup or the ring to their bases affording the entry into that thin opening of a longish adductor-muscle cutting blade to allow the oyster's adductor-muscles to be cut after the said-oysters beak-section has been popped but is still held and positioned within the confine of the cup or ring.

In an embodiment of the device, the base of the cup is attached to the handle by a hinge allowing the cup be tilted away from its normal position to allow an extractable knife to cut the adductor-muscles.

In an embodiment of the device, the backside base of the cup could be connected to a point on the handle via a short fixed post that connects the backside of the cup to a point midway, or close to midway on one side of the handle, with the cup's open mouth pointing away from the handle. In this configuration the surface plane of the cup's open mouth would run parallel to the length of the handle. Additionally an adductor-muscle cutting knife blade could be attached to the rear of the cup and affixed to the rear of the cup in a position pointing upward and parallel to the handle. The user would grip the vertically held handle while the short post connecting the backside of the cup to the side of the handle is positioned between the users index and middle fingers. This arrangement would allow the user to open an oyster with more natural and ergonomic ease and with less hand, wrist and finger strain when gripping the vertical handle in its upright position while applying direct forwarding pressure on the short beak-opening blade within the cup mainly via the user's palm and without the user having to tightly finger grip the handle and without the user having to bend his or her wrist during the process of prying open the oysters beak.

In one embodiment of the device the cup is attached to the handle but is removable by screwing and unscrewing so as to allow the user to add various sizes and styles of liquor gathering safety cups.

In one embodiment the device has a means for changing and removing the beak-opening blade by unscrewing or unlatching it for purposes of size change or renewal.

In one embodiment the device has a means for changing the connection of the cup to the rest of the device from a static and affixed-one to a loose-one allowing the cup to move somewhat independently of the beak-opening knife-blade while, with the provision of an O-Ring mechanism, still remaining capable of 'containing' an oysters liquor without it draining as the cup, to a degree, moves independently of the beak-opening knife blade. A semi-independent movement of the cup via the handle would allow a greater latitude in beak-opening manipulations to be performed by the user during the wielding of the beak-opening knife blade.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A device for collecting an oyster's liquor while safely and simultaneously opening an oyster's beak during the oyster opening process, comprising:

an oyster's beak-opening blade for prying open the oyster's beak;

an oyster liquor collecting safety cup surrounding the oyster's beak-opening blade for collecting oyster's liquor when the oyster's beak section is being pried open while also protecting a user from being injured by the beak-opening blade and with the oyster liquor collecting safety cup having an upper open rim circumference the plane of which resides above the upper most tip section of the beak-opening blade when the beak-opening blade is being employed by a user to pry open the oyster's beak; and an ergonomic handle having a containment area therein for holding the oyster's liquor channeled from the protective retaining cup;

wherein the oyster liquor collecting safety cup is attached at its rear-side base to a front end of the ergonomic handle.

2. The device of claim 1, wherein the beak-opening blade is constructed to be materially stronger and with a more pointed and aggressively sharpened blade tip than is commonly on more typical and traditional oyster knives while being made of stronger and harder materials than commonly found on typical and more traditional oyster opening knives.

3. The device of claim 1, wherein the beak-opening blade is statically attached to the front end of the handle and is shorter than is common on more typical and traditional oyster knives and is preferably about or less than a half an inch in length.

4. The device of claim 1, wherein the beak-opening blade is long but retractable allowing only a tip section to protrude a short distance out of a channel guide within the handle; wherein the tip section, which is used during the beak opening process, remains below the upper open rim-plane of the oyster-liquor collecting retaining cup when the device is being utilized to pry open and pop the oyster's beak.

5. The device of claim 1, wherein the beak-opening blade is removably attached to the front end of the handle allowing a change or replacement of the beak-opening blade.

6. The device of claim 1, wherein the oyster-liquor collecting cup further has a second ring which is smaller than the upper rim and is removably positioned within an interior of the upper rim via a movable mechanical connection to the upper rim allowing the secondary ring to be flipped out of and freed from the interior of the primary ring, thereby providing the user with a choice of differing ring diameters to match oysters of different sizes.

7. The device of claim 1, further comprising an arrangement whereby the beak-opening blade is allowed to rotate, wiggle and move forwards and backwards within the cup while being statically connected to the handle by way of a mechanical-linkage and O-ring style assembly that prevents the collected oyster liquor from exiting the cup's base during the process of manipulating the beak-opening blade as such that within this mode the oyster liquor collecting-cup would be affixed to the handle via a flexible connection.

8. A device for collecting an oyster's consumable liquor while simultaneously opening an oyster's beak-section during the oyster opening process, comprising:

an oyster's beak-opening blade for prying open the oyster's beak;

an oyster liquor collecting safety cup surrounding the beak-opening blade for protecting users from being injured by the beak-opening blade and for collecting oyster's consumable liquor as the oyster's beak section is being pried open, the oyster liquor collecting safety cup having an upper rim plane that resides above the top, forward tip-section of the beak-opening blade when the device is used to pry open the oyster's beak;

an ergonomic handle having a containment area therein for holding the oyster's consumable liquor channeled from the oyster liquor collecting safety cup; and an adductor-muscle cutting blade;

wherein a base of the oyster liquor collecting safety cup is attached to a front end of the ergonomic handle; and wherein the adductor-muscle cutting blade is statically connected to the rear end of the handle or being extendable from and retractable into an interior of the handle or that unfolds from an area along an exterior of the handle.

9. The device of claim 8, wherein the oyster liquor collecting safety cup is removably attached to the front end of the handle allowing the user to change various sizes and styles of the cups.

10. The device of claim 8, wherein the oyster liquor collecting safety cup is attached by a hinge element to the front end of the handle allowing the cup to be tilted away from its normal position while a slit in the side of the cup allows the tilted cup to 'clear' the short beak-opening blade.

11. A device for collecting an oyster's consumable liquor while simultaneously opening an oyster's beak-section during the oyster opening process, comprising:

a long retractable knife blade;

an oyster liquor collecting safety cup surrounding the retractable knife blade for collecting and holding an oysters consumable liquor and for protecting users from being injured by the retractable knife blade as the oyster's beak shell section is being pried open, the oyster liquor collecting safety cup having an upper rim plane that is situated slightly above a tip section of the retractable knife blade when the device is being employed and manipulated to pry open an oyster's beak section; and an ergonomic handle having a containment area therein for holding the oyster's liquor channeled from the oyster liquor collecting safety cup, and a channel guide for holding a portion of the long retractable knife blade;

wherein a base of the oyster liquor collecting safety cup is attached to a front end of the ergonomic handle;

wherein when it is needed to pry open the oyster's beak, the long retractable knife blade is partially retracted into the channel guide within the handle leaving only the tip section of the long knife blade to remain outside of the handle and below the upper rim plane of the oyster liquor collecting safety cup such that the tip section is being used to pry open the oyster's beak, and when it is needed to cut free the oyster's adductor-muscles, a further length of the retractable knife blade is extended from the handle for cutting free the oyster's adductor-muscles.

12. The device of claim 11, wherein the oyster liquor collecting safety cup is removably attached to the front end of the handle allowing the users to change various sizes and styles of the oyster-liquor collecting cups depending on the needs of the process.

13. The device of claim 11, wherein the oyster liquor collecting safety cup is attached by a hinged element to the front end of the handle allowing the cup to be tilted away from its normal position.

14. The device of claim 11, wherein the long retractable knife blade is removably attached to the handle allowing replacement of the long retractable knife blade.

* * * * *